United States Patent
Chan

(10) Patent No.: US 7,460,689 B1
(45) Date of Patent: Dec. 2, 2008

(54) SYSTEM AND METHOD OF DETECTING, RECOGNIZING, AND TRACKING MOVING TARGETS

(75) Inventor: Alex Lipchen Chan, Germantown, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 630 days.

(21) Appl. No.: 11/223,243

(22) Filed: Sep. 9, 2005

Related U.S. Application Data

(60) Provisional application No. 60/610,141, filed on Sep. 15, 2004.

(51) Int. Cl.
*G06K 9/00* (2006.01)
(52) U.S. Cl. .................. 382/103; 382/291; 375/240.16
(58) Field of Classification Search .................. 382/100, 382/103, 106, 107, 118, 154, 172, 173, 181, 382/190, 194, 203, 219, 224, 232, 237, 254, 382/274, 276, 286, 291, 305; 375/240.16, 375/240.08; 340/577; 709/247; 348/94; 380/212
See application file for complete search history.

(56) References Cited

U.S. PATENT DOCUMENTS

| | | | |
|---|---|---|---|
| 5,828,848 A * | 10/1998 | MacCormack et al. ...... 709/247 |
| 6,298,143 B1 | 10/2001 | Kikuchi et al. |
| 6,633,655 B1 * | 10/2003 | Hong et al. .................. 382/118 |
| 6,697,010 B1 | 2/2004 | Lam |
| 6,707,488 B1 | 3/2004 | Anuashvili et al. |
| 6,756,935 B1 | 6/2004 | Cameron et al. |
| 6,765,525 B2 | 7/2004 | Bickert et al. |
| 6,809,682 B1 | 10/2004 | Madewell |
| 6,895,048 B2 | 5/2005 | Boice et al. |
| 6,985,620 B2 * | 1/2006 | Sawhney et al. ............. 382/154 |
| 7,002,478 B2 * | 2/2006 | Moore et al. ................. 340/577 |
| 7,227,893 B1 * | 6/2007 | Srinivasa et al. ....... 375/240.08 |
| 7,302,004 B2 * | 11/2007 | Zhang et al. ........... 375/240.16 |
| 2001/0043738 A1 * | 11/2001 | Sawhney et al. ............. 382/154 |
| 2005/0147170 A1 * | 7/2005 | Zhang et al. ........... 375/240.16 |

* cited by examiner

*Primary Examiner*—Seyed Azarian
(74) *Attorney, Agent, or Firm*—Edward L. Stolarun

(57) ABSTRACT

A system and method of tracking moving targets in video images comprises retrieving a reference video frames each comprising arrays of digital pixels; computing a first averaged image for each of the reference video frames, wherein each pixel value of the first averaged image comprises an average pixel intensity value associated with all corresponding pixel values in the reference video frames; computing a second averaged image for a second set of the reference video frames, wherein each pixel value of the second averaged image comprises an average pixel intensity value associated with all corresponding pixel values in the reference video frames; viewing an input video frame comprising arrays of digital pixels; subtracting the input video frame from the first and second averaged images separately to form at two difference images; and combining the difference images to form a change map.

21 Claims, 5 Drawing Sheets

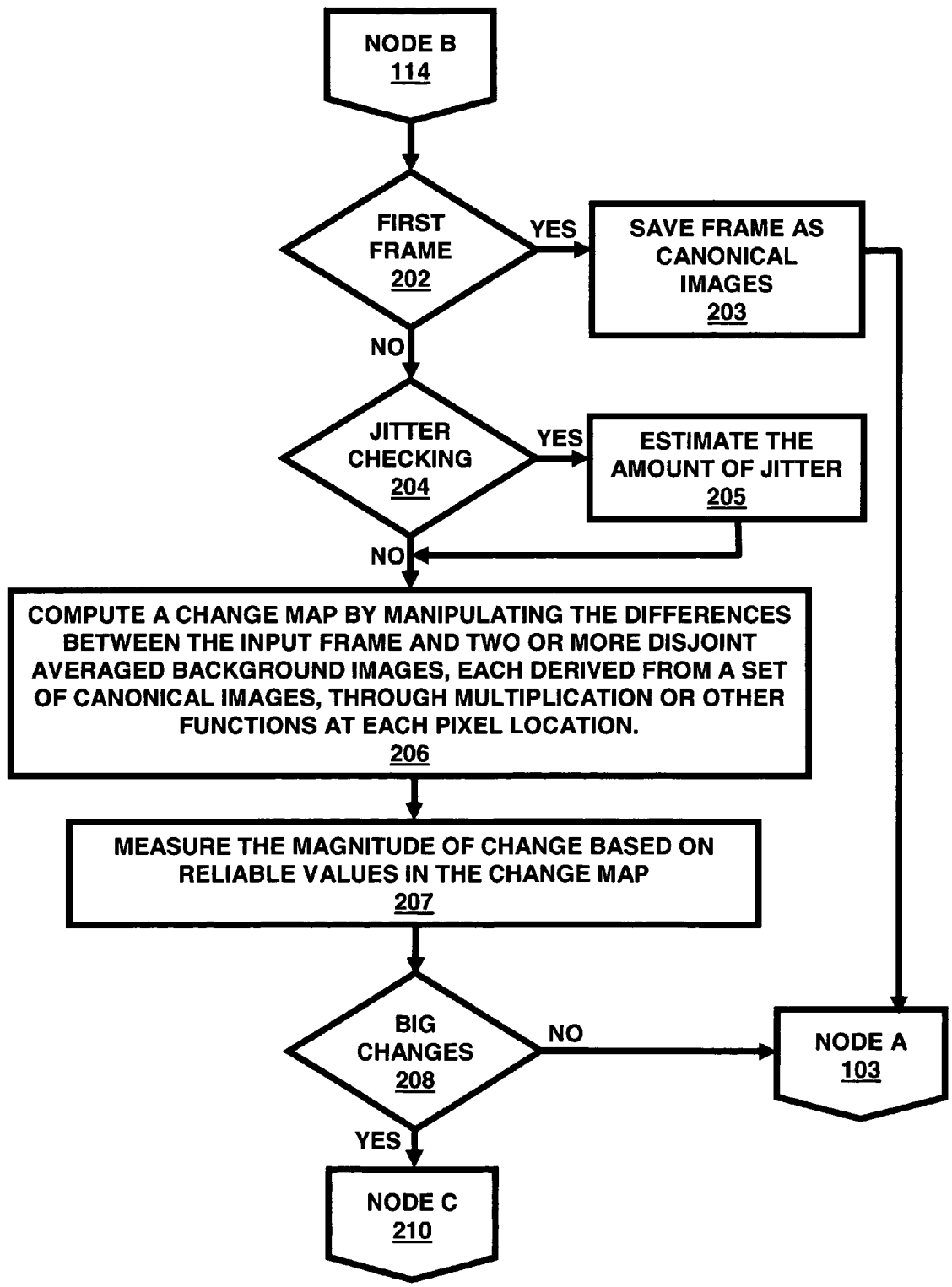

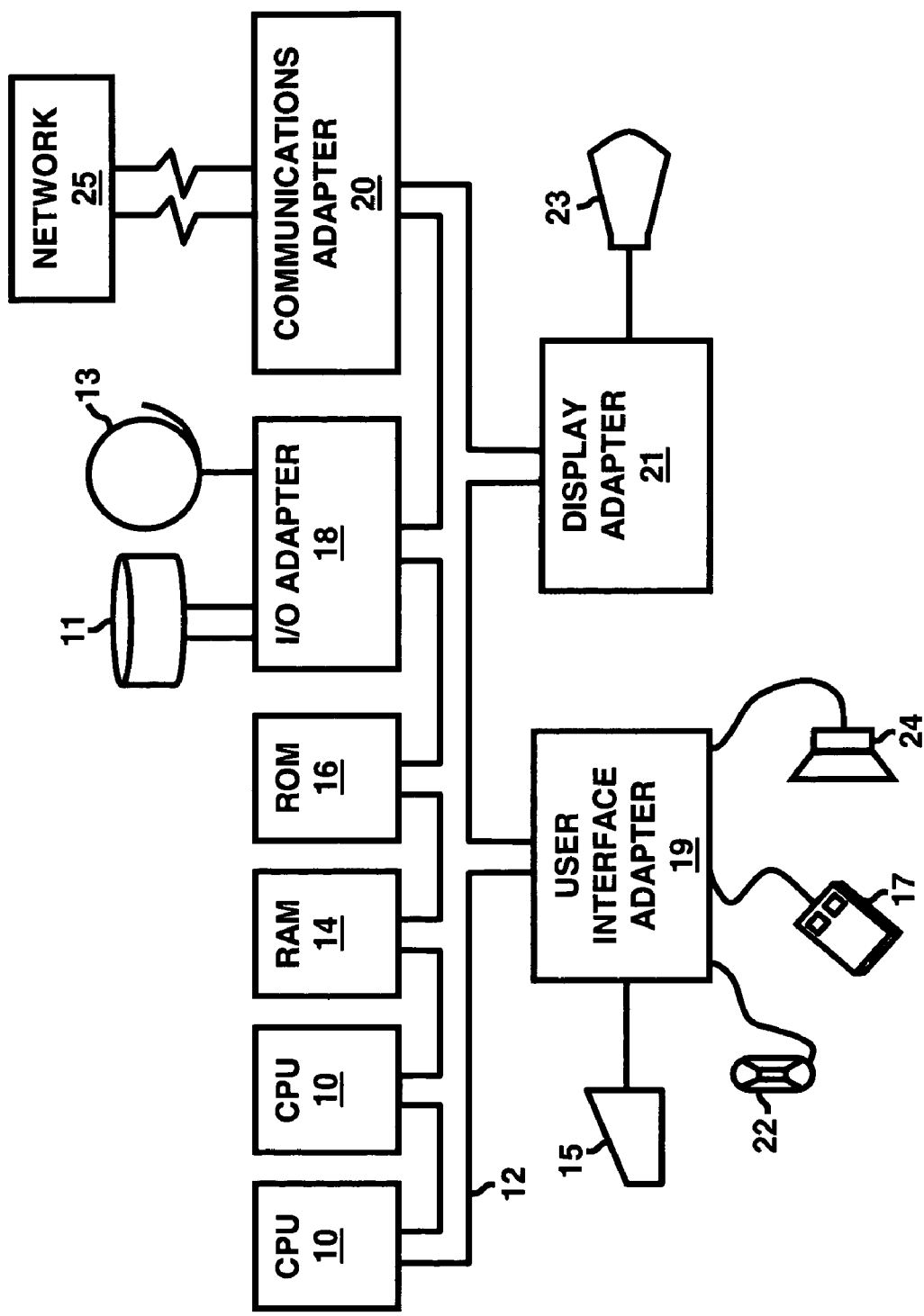

SYSTEM AND METHOD OF DETECTING, RECOGNIZING, AND TRACKING MOVING TARGETS

CROSS-REFERENCE TO RELATED APPLICATION

This application claims the benefit of U.S. Provisional Patent Application No. 60/610,141 filed Sep. 15, 2004, the complete disclosure of which, in its entirety, is herein incorporated by reference.

GOVERNMENT INTEREST

The embodiments of the invention described herein may be manufactured, used, and/or licensed by or for the United States Government.

A portion of the disclosure of this patent document, as provided in the Appendix herein, includes material that is subject to copyright protection. The copyright owner has no objection to the facsimile reproduction by anyone of this patent document or the patent disclosure, as it appears in the U.S. Patent and Trademark Office patent file or records, but otherwise reserves all copyright rights whatsoever.

BACKGROUND OF THE INVENTION

1. Field of the Invention

The embodiments of the invention generally relate to moving target detection and, more particularly, to moving target detection used in video surveillance applications.

2. Description of the Related Art

Moving target indication (MTI) methodologies are essential tools to detect, locate, recognize, and track the moving targets of interest in a movie or video sequence. Different MTI methodologies can be characterized and compared by their hit rates (percentage of all available targets of interest detected and located), recognition rates (percentage of each of the existing target types correctly recognized), false-alarm rates (average number of false alarms reported per video frame), efficiency of operation (how much computational resources and time is needed for a given set of data), and robustness (how well the methodology is able to handle or adapt to different types of data). An ideal MTI methodology should generally be able to detect, recognize, and track all targets of interest without incurring an unacceptable number of false alarms under a very stringent computational requirement.

Generally, most of the conventional MTI methodologies look for changes in a video sequence by subtracting the current image frame (arrays of digital pixels) being viewed from the previous one. While it is the simplest way to do so, this method typically produces more false alarms and generally does not work well when the targets are moving slowly relative to their sizes. Additionally, problems in variations in contrast, brightness, and other video parameters, as well as aliasing, jitter, and background errors can cause positive false alarms. Some conventional techniques attempt to stabilize the background information and reduce the false alarms by creating an average image consisting of several previous frames. However, these conventional methods tend to create a trailing ghost shadow that causes new false alarms and which are generally difficult to suppress especially when some of the moving targets are brighter than their surroundings while others are darker than their background in the same video sequence. In this situation, conventional methodologies tend to result in either detecting only those targets in the chosen polarity and the shadows of the opposite polarity or the targets and shadows of both polarities. If half of the moving targets are brighter than their surroundings and the other half is darker, then either nearly half of the targets would be forsaken or nearly twice as many false-alarms would be generated. Obviously, neither one of these two cases is acceptable to a robust tracking methodology.

Unfortunately, the conventional solutions have generally not been able to overcome these shortcomings. Therefore, there remains a need for a novel MTI methodology that is capable of detecting, recognizing, and tracking most, if not all, of the interested targets with an acceptable number of false alarms under a very stringent computational requirement.

SUMMARY OF THE INVENTION

In view of the foregoing, the embodiments of the invention provide a method of tracking moving targets in video images, and a program storage device readable by computer, tangibly embodying a program of instructions executable by the computer to perform the method of tracking moving targets in video images, wherein the method comprises retrieving a plurality of reference video frames each comprising arrays of digital pixels; computing a first averaged image for each of the plurality of reference video frames, wherein each pixel value of the first averaged image comprises an average pixel intensity value associated with all corresponding pixel values in the plurality of reference video frames; computing a second averaged image for a second set of the plurality of reference video frames, wherein each pixel value of the second averaged image comprises an average pixel intensity value associated with all corresponding pixel values in the plurality of reference video frames; viewing an input video frame comprising arrays of digital pixels, wherein the input video frame is sequenced consecutively after the plurality of reference video frames; subtracting the input video frame from the first and second averaged images separately to form two difference images; and combining the difference images to form a change map.

The method may further comprise multiplying each pixel value associated with a first difference image with a value of a corresponding pixel of a second difference image. Additionally, the method may further comprise combining an even number of difference images together, wherein the even number is at least two. Furthermore, the method may further comprise computing a mean and standard deviation associated with the average pixel intensity values for each predefined, non-overlapping, and fully partitioning blocks of the change map. Also, the method may further comprise measuring a magnitude of change experienced in each partitioning block of the change map.

Moreover, the method may further comprise enhancing a digital signature of moving objects in the change map using a pyramidal mean stacking process; determining a pixel location in the enhanced change map that exhibits a highest pixel intensity value; determining whether the highest pixel intensity value meets a minimum acceptance threshold for detection; and determining whether a maximum allowable number of detections per input frame has been reached. Also, the method may further comprise predefining values for the minimum acceptance threshold for detection and maximum allowable number of detections per input frame.

Another embodiment of the invention provides a system for tracking moving targets in video images, wherein the system comprises means for retrieving a plurality of reference video frames each comprising arrays of digital pixels; means for computing a first averaged image for each of the plurality of reference video frames, wherein each pixel value of the first averaged image comprises an average pixel intensity value associated with all corresponding pixel values in the plurality of reference video frames; means for computing a second averaged image for a second set of the plurality of reference video frames, wherein each pixel value of the second averaged image comprises an average pixel intensity value associated with all corresponding pixel values in the plurality of reference video frames; means for viewing an input video frame comprising arrays of digital pixels, wherein the input video frame is sequenced consecutively after the plurality of reference video frames; means for subtracting the input video frame from the first and second averaged images separately to form two difference images; and means for combining the difference images to form a change map.

The system may further comprise means for multiplying each pixel value associated with a first difference image with the value of the corresponding pixel of a second difference image. Moreover, the system may further comprise means for combining an even number of difference images together, wherein the even number is at least two. Additionally, the system may further comprise means for computing a mean and standard deviation associated with the average pixel intensity values for each predefined, non-overlapping, and fully partitioning blocks of the change map. Also, the system may further comprise means for measuring a magnitude of change experienced in each partitioning block of the change map.

Furthermore, the system may further comprise means for enhancing a digital signature of moving objects in the change map using a pyramidal mean stacking process; means for determining a pixel location in the enhanced change map that exhibits a highest pixel intensity value; means for determining whether the highest pixel intensity value meets a minimum acceptance threshold for detection; and means for determining whether a maximum allowable number of detections per input frame has been reached. The system may further comprise means for predefining values for the minimum acceptance threshold for detection and maximum allowable number of detections per input frame.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIGS. 1(a) through 1(d) are flow diagrams illustrating preferred methods according to the embodiments of the invention; and FIG. 2 is a schematic diagram of computer system according to an embodiment of the invention.

DETAILED DESCRIPTION OF PREFERRED EMBODIMENTS OF THE INVENTION

Figure 1A:
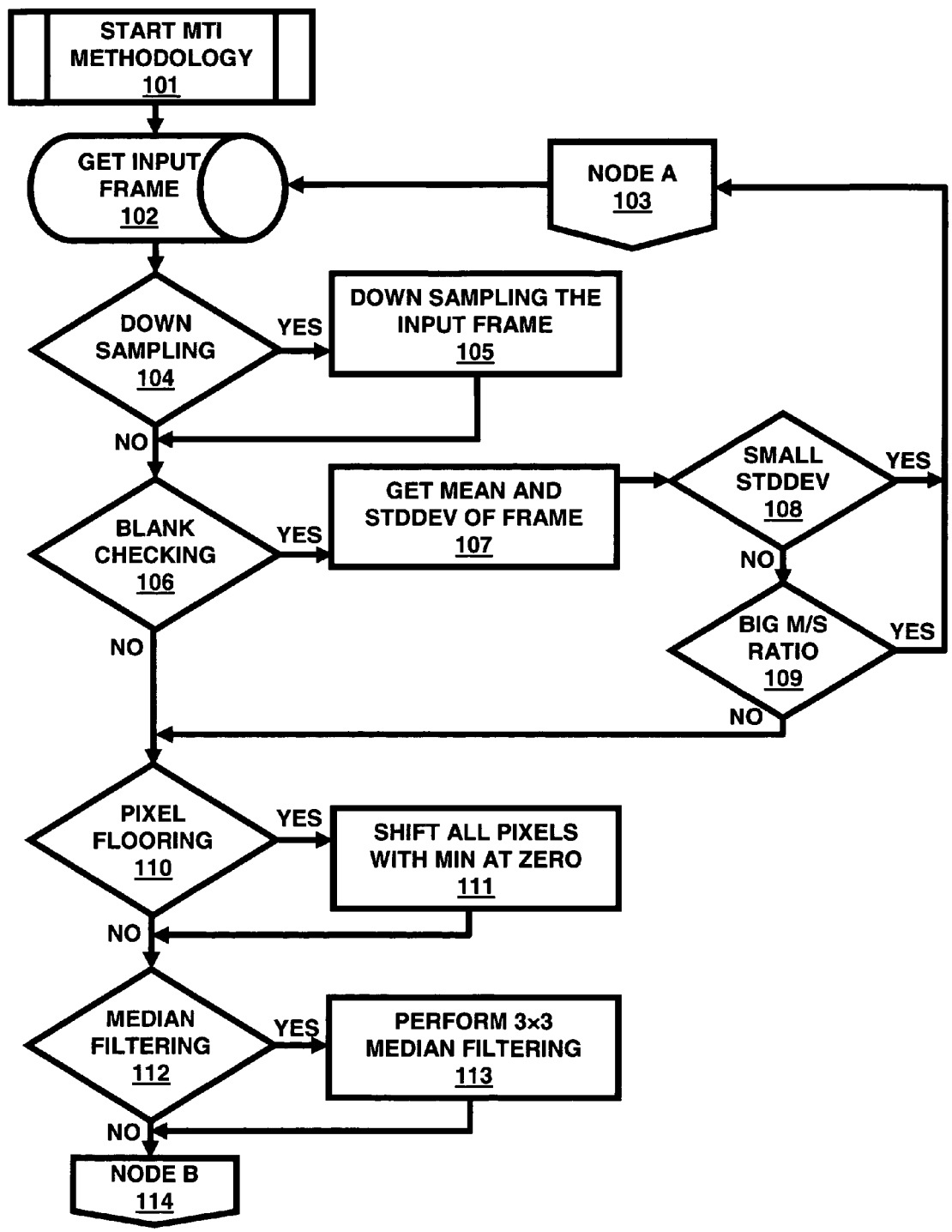

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a novel MTI methodology that ideally is capable of detecting, recognizing, and tracking all targets of interest without incurring any false alarms under a very stringent computational requirement. The embodiments of the invention approach this goal by providing a MTI methodology that analyzes the current input frame with respect to two (or some other even number of) disjoint "averaged images". Each averaged image is computed by averaging a given set of recent input frames or canonical images, pixel by pixel across the frames. Different sets of canonical images are used to compute these averaged images. The selected sets of canonical images are mutually exclusive and separated in time by a predefined number of input frames as a buffer. A number of computative operations can be performed between the current input frame and the averaged images in order to achieve superior detection, recognition, and tracking performance. The embodiments of the invention indicate that by multiplying the two (or other even number of) difference images that are obtained by subtracting the current input frame from those averaged images, the aforementioned trailing ghost shadow problems are significantly reduced. Referring now to the drawings and more particularly to FIGS. 1(a) through 2, where similar reference characters denote corresponding features consistently throughout the figures, there are shown preferred embodiments of the invention.

As shown in FIG. 1(a), the embodiments of the invention operate by starting (101) the MTI methodology, whereby an input frame is retrieved (102) from a video sequence. Then, a decision has to be made on whether the input frame should be down-sampled or sub-sampled (104). Down sampling is a process in which the input frame is scaled down to a smaller and similar image. Generally, smaller images enable faster computation and less information is required to be processed in subsequent steps of the methodology provided by the embodiments of the invention. However, the smaller the input frame is down-sampled to, the more of the original detail information is discarded, and the more difficult it can be to locate moving targets. Thus, a good trade-off between computation cost and performance (for example, detection rate) should be determined. If down sampling is desired (Yes), then the input frame undergoes down sampling (105). Regardless of whether a down sampling process is performed, the next decision to be made is whether the input frame should examined (106) for blank or near-blank content. The process of checking for blank content consumes some computational resources upfront, but it could avoid futile computation and erroneous results later in the tracking process, if the current input frame is indeed a blank image. If one chooses to check for blank or near-blank content (Yes), then the mean and standard deviation of all pixel values of the input frame are calculated (107).

The value of the standard deviation is examined (108). A very small standard deviation indicates a very flat or blank input frame. When the standard deviation is smaller than a predefined value; for example, 20, the process rejects the current input frame and attempts to retrieve the next input frame (102) via Node A (103). In this regard, Node A is simply a common connection node for steps 108, 109, 203, 208, and 408 described in FIGS. 1(a) through 1(d). If the standard deviation is larger than the predefined value, then one should examine (109) the ratio of the mean to the standard deviation. Some cameras produce over-exposed images with a relatively large standard deviation (for example, 40) at a very high mean value (for example, 800). A large mean to standard deviation ratio; for example, larger than 10, indicates this type of abnormal input image. If the computed mean to standard deviation ratio is higher than a predefined value, then the process rejects the current input frame and attempts to retrieve the next input frame via Node A (103). Otherwise, the process continues as in the case where blank checking (106) is not performed (No) at all.

The next decision is whether a pixel flooring step should be performed (110). If pixel flooring is desired (Yes), then the pixel with the minimum intensity is set to zero (i.e., floored) and all other pixels are shifted (111) by a corresponding amount. The floored image is set as the output image. Performing a pixel flooring operation (111) is desirable because the digital data from some cameras produce high pixel values (i.e., approximately between 8,100 and 8,250 pixels), but are only within a very small dynamic range (i.e., approximately 100). The contrast level of the pixels is not changed in the pixel flooring operation (111), thus, the operation (111) does not introduce unwanted large mean shifts when bright objects enter or exit the image/scene. Additionally, the input image may be smoothed, if necessary, using well-known smoothing techniques. If pixel flooring is not desired (No), or upon completion of pixel flooring (111), then it is determined whether median filtering is desired (112).

If median filtering is desired (Yes), then the process performs (113) a 3×3 (i.e., the default kernel size of the filter is 3×3) median filtering process. The median filtering process (113) removes noisy speckles from the images and flattens noisy near-blank background regions of the images. The median filtering process (113) is generally a non-linear process in which the value of a pixel is replaced with the median value of the original pixel values within its 3×3 neighborhood (or a smaller neighborhood for a pixel located at the border of the input image). Regardless of the median filtering decision, the process moves to Node B (114), which is the ending connection node for FIG. 1(a) and the starting connection node for FIG. 1(b).

Moving from the connection Node B (114) in FIG. 1(b), the next task is to determine (202) whether the current input frame is the first frame arriving to this stage since the MTI process is started (101) (as indicated in FIG. 1(a)). If this is indeed the first frame that has managed to get this far (Yes), then the input frame is saved (203) as a canonical image and the detection system attempts to retrieve the next input frame (102) (of FIG. 1(a)) via Node A (103). Canonical images serve as the short term memory of the image sequence and create adaptive background information by continuously updating the averaged images. If the current input frame is not the first frame arriving to this stage in this process (No), then a decision has to be made whether a jitter checking operation is needed (204). If jitter (i.e., shaking between frames typically caused by noticeable shaking of the camera that could induce some false alarms) is common to the current input sequence, then the amount of jitter should be estimated (Yes). The jitter estimation operation (205) uses a predefined number of sensing patches of adjustable sizes to determine the most probable amount of jitter occurring between consecutive frames. This operation (205) can reduce the false alarms effectively when the camera experiences jitter, such as under a strong wind, when the amount of jitter estimated is taken into consideration during the computation of difference images in the subsequent step (206). Whether or not the jitter estimation is performed (205), the process moves on to the following step (206).

To determine what new changes occur in the current frames, one should obtain a reliable change-indication image (i.e., a change map). The first operation in this step (206) is to compute an even number of difference images by subtracting the current input frame from an even number of averaged images. As previously described, the averaged images are produced and updated by using disjoint sets of canonical images during the MTI process provided by the embodiments of the invention. The jitter estimation from the previous optional step (205), if available, is used in the computation of difference images. The change map is then obtained by combining the difference images, pixel by pixel, through multiplication or other suitable mathematical operations. Because the methodology multiplies an even number of difference images derived from disjoint sets of canonical images, the resulting change map is always an all-positive matrix, regardless of the polarity of the moving or changed targets.

On a given difference image, the strength and length of the trailing ghost shadow is reciprocally and proportionally related to the number of canonical images used to form the corresponding averaged image, respectively. Because the averaged images are computed using disjoint sets of canonical images, the trailing ghost shadows of a given moving target would show up at different places on different difference images, hence can be easily suppressed through a multiplication operation (since the area on the difference image that does not contain either target or shadow would have zero or near-zero pixel values). On the other hand, the current location of a moving target always appears at the same location on all difference images; typically and easily recognizable as large positive pixel values.

Next, the magnitude of change, based on the reliable values in the change map, is measured (207). This measurement is carried out on non-overlapping partitioning blocks or patches across the entire change map to avoid overlooking the changes incurred by small targets over a relatively calm background. Small pixel values below a predefined noise threshold, typically representing the variations caused by sensor noise, are ignored in this measurement. The result of this measurement is passed to the following decision node (208). If any significant change above a predefined change threshold is found in any block on the change map (Yes), then the process moves to Node C (210), which is the ending connection node in FIG. 1(b) and the starting connection node in FIG. 1(c). Otherwise, it means nothing significant has changed in the current input frame (No) and the process moves to fetch the next input frame (102) (of FIG. 1(a)) via Node A (103) as the connection point.

Figure 1C:
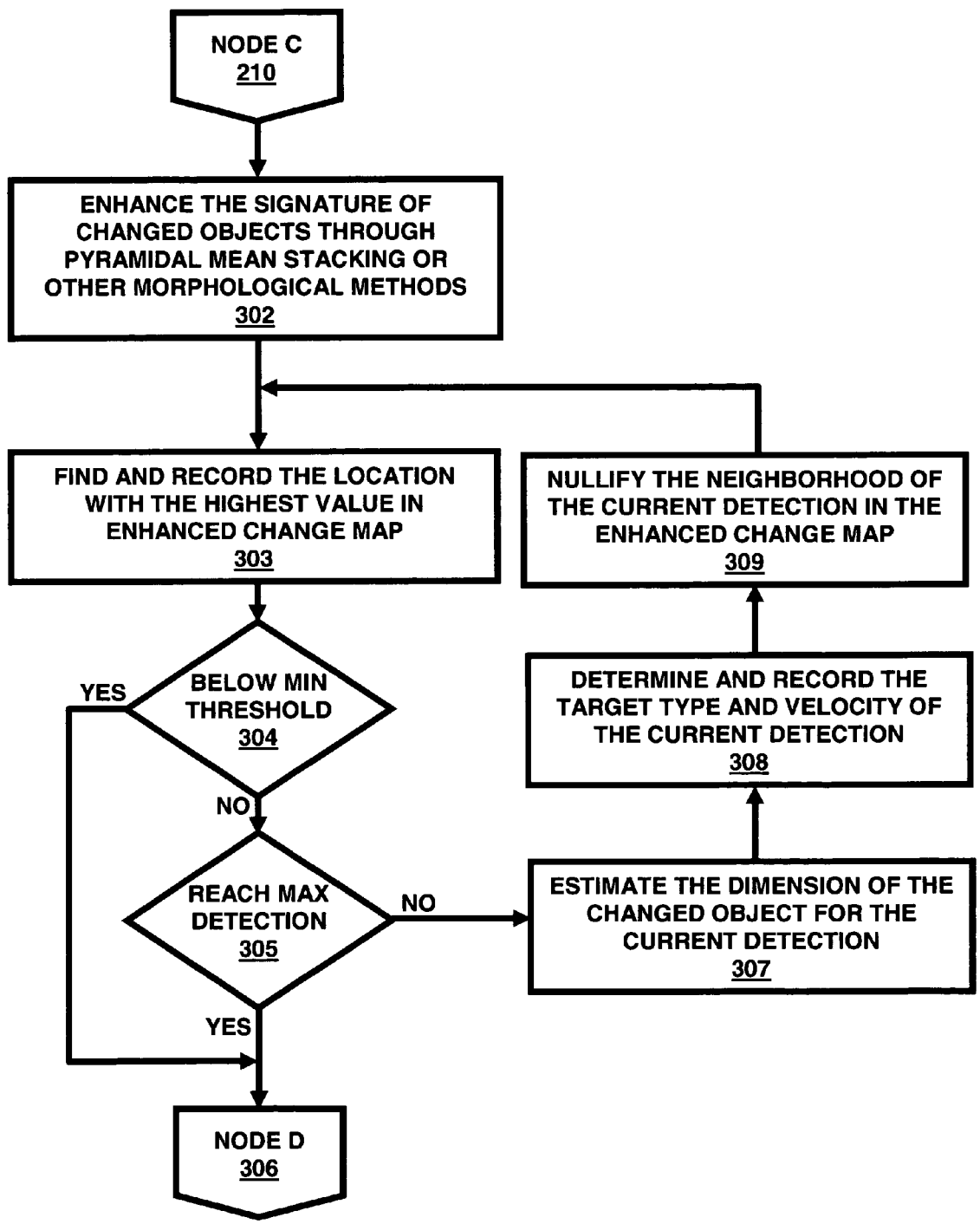

Node C (210) connects the process from FIG. 1(b) to FIG. 1(c), which leads to the enhancing step (302) of the change map originally obtained in step (206) (of FIG. 1(b)). The signatures of valid targets in the original change map are often inconsistent, incomplete, and noisy. One may apply different signature-enhancing techniques to improve the target silhouette and reduce unwanted noises in the change map. These techniques include pyramidal mean stacking, where the value of a given pixel is replaced by the sum of its local means (which are computed based on different neighborhood sizes centering at that pixel), as well as other morphological methods that involve the opening of regions and closing of gaps related to each target silhouette. As the result, the target signature becomes fuller and stronger, while the speckles of noise are removed or significantly reduced.

Thereafter, all the blocks that are previously identified in step (207) (of FIG. 1(b)) as experiencing noticeable changes are examined and the location with the highest value in the enhanced change map is determined and recorded (303). Next, it is determined whether this highest value is below a user-defined minimum acceptance detection threshold (304). If this peak value is below the acceptable threshold (Yes), then the process moves to ending connection Node D (306). If the peak value is above the acceptable threshold (No), then the next decision is whether the process has already reached (305) the predefined maximum number of detections for this input frame. If the process has reached the maximum number of detections allowed (Yes), then the process moves to ending connection Node D (306). Otherwise (No), the dimension of the changed object for the current detection is estimated (307) by measuring the width and height of all apparent edges of this object. Then, the target type and velocity of the current detection are determined and recorded (308). To avoid the neighboring pixels of the current peak value, which are associated with the same object, being chosen in the next selection cycle, all neighboring pixels within the neighborhood of the selected location are nullified (309). The size of this neighborhood is the same as the estimated dimension of the current object. Then the process moves to determine (303) the next valid detection and repeats the loop until either the remaining peak value is below the minimum detection acceptance threshold or the maximum number of detections has been reached.

Figure 1D:
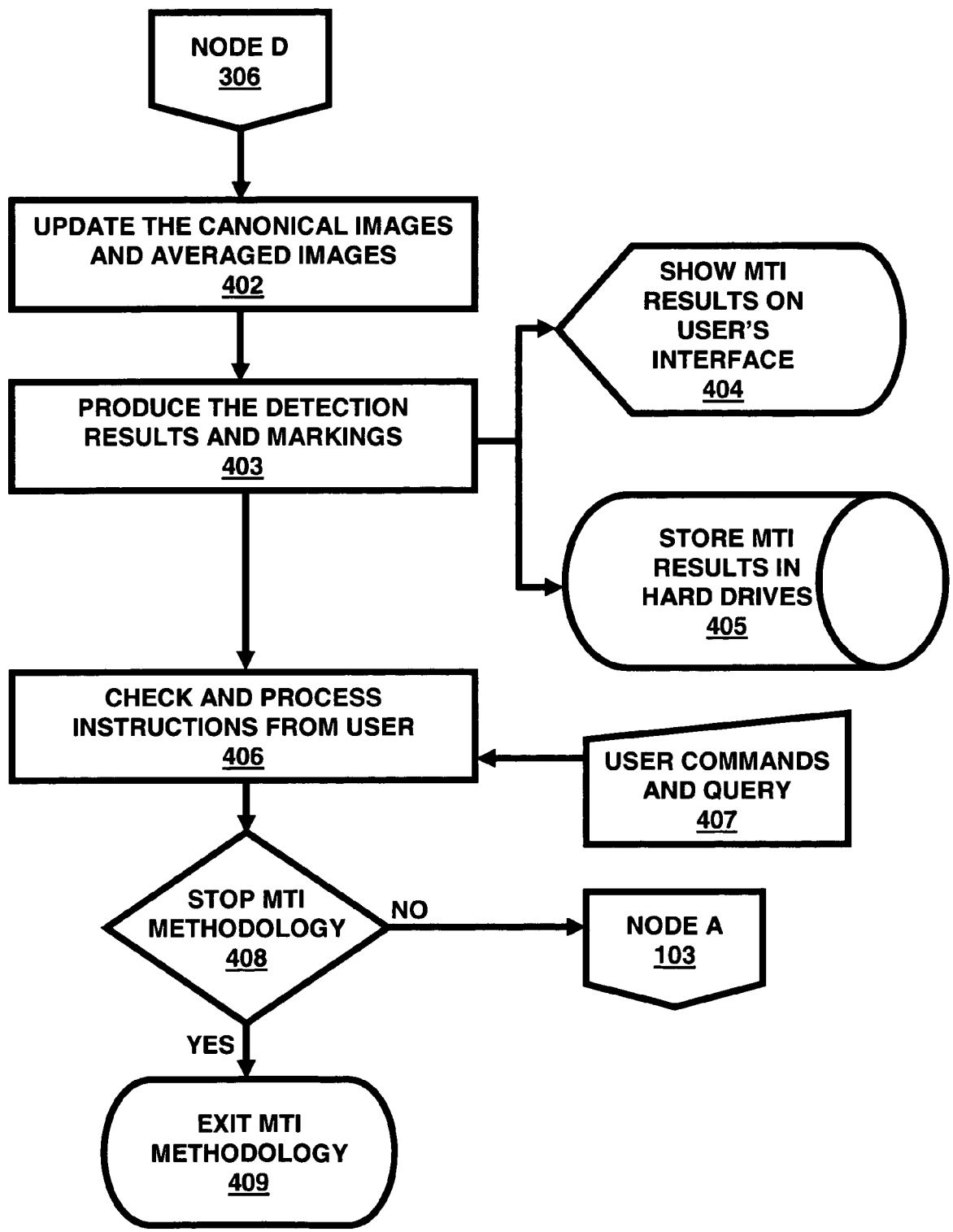

Once all of the valid or allowable detections have been made, the process continues to Node D (306), which is the ending connection node of FIG. 1(c) and the starting connection node of FIG. 1(d). The next step is to update (402) the content of canonical images and averaged images. The current input frame is incorporated into the most recent set of canonical images and oldest frame of the oldest set of canonical images is purged. The rest of the images in the canonical image sets and separation buffers are forwarded one step in the order of the timeline. Due to the content shifting in the canonical sets, the averaged image associated with each canonical image set is also updated accordingly. However, not all of the information of the current input frame is incorporated into the averaged image. Rather, only the relatively stable blocks; i.e., those without significant change observed in step (207) (of FIG. 1(b)) for the past few frames, are used to update the averaged image.

The next step of the process is to produce (403) the detection results by marking boxes on the input frame to identify the location and dimension of each detected object. These textual or graphical results can be shown (404) on a user's interface or stored (405) in a storage device (i.e., hard drives). Then, the process checks (406) for new instructions and queries (407) from a user and processes them accordingly. The next decision to be made is whether the process should be terminated (408), either because the user has issued a stopping command or all the available input frames have already been processed. If the process should continue (No), then it moves to get a new input frame (102) (of FIG. 1(a)) via the connecting Node A (103). Otherwise (Yes), the process moves to the terminating node (409) and the MTI methodology provided by the embodiments of the invention is terminated (exit).

Generally, the embodiments of the invention include the creation of two averaged images by averaging two separate and disjoint sets of the previous input frames or canonical images. A change map is obtained by first subtracting the current input frame from both averaged images separately and then multiplying the two difference images pixel by pixel. In this way, the trailing ghost shadows in the two difference images are suppressed in the resulting change map. Furthermore, the multiplication operation always produces a high positive value at the areas of movement, regardless of the intensity of the moving objects with respect to their surroundings. In other words, the moving or changed targets can be located much easier, while the false alarms are suppressed everywhere else.

A system for tracking moving targets in video images in accordance with an embodiment of the invention may include a computer device comprising a processor(s), such as the central processing units or CPUs (10) shown in FIG. 2, each comprising sub-components (not shown), which are adapted to perform multiple functions, including, but not limited to, retrieving a plurality of reference video frames each comprising arrays of digital pixels; computing a first averaged image for each of the plurality of reference video frames, wherein each pixel value of the first averaged image comprises an average pixel intensity value associated with all corresponding pixel values in the plurality of reference video frames; computing a second averaged image for a second set of the plurality of reference video frames, wherein each pixel value of the second averaged image comprises an average pixel intensity value associated with all corresponding pixel values in the plurality of reference video frames; viewing an input video frame comprising arrays of digital pixels, wherein the input video frame is sequenced consecutively after the plurality of reference video frames; subtracting the input video frame from the first and second averaged images separately to form two difference images; and combining the difference images to form a change map.

The CPU (10) may further be adapted to multiply each pixel value associated with a first difference image with the value of the corresponding pixel of a second difference image; combine an even number of difference images together, wherein the even number is at least two; compute a mean and standard deviation associated with the average pixel intensity values for each predefined, non-overlapping, and fully partitioning blocks of the change map; and measure a magnitude of change experienced in each partitioning block of the change map.

Furthermore, the CPU (10) may further be adapted to enhance a digital signature of moving objects in the change map using a pyramidal mean stacking process; determine a pixel location in the enhanced change map that exhibits the highest pixel intensity value; determine whether the highest pixel intensity value meets a minimum acceptance threshold for detection; and determine whether a maximum allowable number of detections per input frame has been reached. The CPU (10) may further be adapted to predefine values for the minimum acceptance threshold for detection and maximum allowable number of detections per input frame.

The embodiments of the invention can take the form of an entirely hardware embodiment, an entirely software embodiment, or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments of the invention is depicted in FIG. 2. This schematic drawing illustrates a hardware configuration of an information handling/computer system in accordance with the embodiments of the invention. The system comprises at least one CPU (10). The CPUs (10) are interconnected via a system bus (12) to various devices such as a random access memory or RAM (14), a read-only memory or ROM (16), and an input/output (I/O) adapter (18). The I/O adapter (18) can connect to peripheral devices, such disk units (11) and tape drives (13), or other program storage devices that are readable by the system. The system can read the inventive instructions on the program storage devices and follow these instructions to execute the methodology of the embodiments of the invention. The system further includes a user interface adapter (19) that connects a keyboard (15), mouse (17), speaker (24), microphone (22), and/or other user interface devices such as a touch screen device (not shown) to the system bus (12) to gather user input. Additionally, a communication adapter (20) connects the system bus (12) to a data processing network (25), and a display adapter (21) connects the system bus (12) to a display device (23) which may be embodied.

APPENDIX

This appendix provides an exemplary example of computer program code, which may be used to implement the methodology provided by the embodiments of the invention. The computer program code described below, which is written in ANSI C language, is merely an example of the implementation of the embodiments of the invention, and those skilled in the art would readily understand that other computer program codes could equally be used in accordance with a programmer's preferred choice, and the embodiments of the invention are not limited to any particular computer language or code to implement the embodiments of the invention.

The first program, referred to as "TRACKING.C", performs the major task of tracking moving targets in a given sequence of images. It includes the preprocessing step that operates on the input images to get some insights on the characteristics of these images and modifies them, if necessary, to help the subsequent processing steps. It also performs target detection and various reporting functions. It is a part of the overall software, which is used to perform the moving target detection and tracking for a video surveillance application.

include "fpss.h"

/* Function Prototypes. */
void TRACKING(char *imgfname, short imgin, short imgsub, short **imgsmth,
        short imgdif, float imgpyr, int imgcum, short *imgcan,
        float *imgavg, char argarr, char *objmap, int subhgt,
        int subwdh, struct Partition **block, int blkszx, int blkszy,
        struct Point *change, struct Point *detect, struct Params *key);
void PIXEL_FLOORING(short imgin, short imgout, int wdh, int hgt);
void MEDIAN_FILTER(short img1, short img2, int wdh, int hgt,
        int winx, int winy);
void PYRAMID_MEANS_BLOCK(short img1, float img2, int **imgcum, int wdh,
        int hgt, struct Partition **block, int blkctx,
        int blkcty, int blkszx, int blkszy);
void PYRAMID_MEANS_ALL(short img1, float img2, int **imgcum, int wdh, int hgt);
void GET_MEAN_STDDEV(short **img, int x1, int y1, int x2, int y2, float *mean,
        float *stddev);
void MEASURE_JITTER(float reffrm, short newfrm, int wdh, int hgt,
        struct Params *key, int *xmvt, int * ymvt);
void DETECT_TARGET(float imgpyr, int wdh, int hgt, struct Partition block,
        char *objmap, struct Point *detect, int *ndet,
        struct Params *key);
void DETECT_CHANGE(float **imgpyr, int wdh, int hgt, char *objmap,
        struct Point *change, int *nchg, struct Params *key);
void MARK_DETECTION(short **img, int wdh, int hgt, struct Point *detect,
        int ndet);
void WRITE_IMAGE(char *fname, short **img, int wdh, int hgt, char *format);
void QT_UPDATE(struct Params *key, char *args, char **argv, char *objmap);

```
/****************************************************************/
/* Perform all the necessary preprocessing, tracking, and post-processing   */
/* steps on the images as indicated by the control parameters.              */
/****************************************************************/ void TRACKING(char *imgfname, short imgin, short imgsub, short **imgsmth,
        short imgdif, float imgpyr, int imgcum, short *imgcan,
        float *imgavg, char argarr, char *objmap, int subhgt,
        int subwdh, struct Partition **block, int blkszx, int blkszy,
        struct Point *change, struct Point *detect, struct Params *key)
{ float mean, stddev;
  int blkchg, blkctx, blkcty, blkpix, bw, bx, by, chg, det, px, py, itmp,
    nchg, ndet, ncanhist, samtimes, stabmax, stabmin, xmvt, ymvt, totblk;
  static int cancur=0, first=1, frm=-1, initchgbackgd=0;
  char basename[80], *cutin, stmp[150], v5buf[1024];
  int stmpbytes = 149; // number of bytes in stmp - 1
  short v5bytes;
  FILE *v5file;

/* Create the basename by removing any directory name and */
  /* file extension from key->FrmListName. */
  if ((cutin = strrchr(key->FrmListName, '/')) != NULL)
    strcpy(basename, &cutin[1]);
  else strcpy(basename, key->FrmListName);
  if ((cutin = strchr(basename, '.')) != NULL) cutin[0] = '\0';

/* Increase the frm count. */
  frm++;

/* Initialize local variables for faster execution. */
  blkctx = key->NBlockX;
  blkcty = key->NBlockY;
  totblk = blkctx * blkcty;
  ncanhist = key->NCanHist;
  samtimes = key->SubSamTimes;
  stabmax = key->BlkStabMax;
  stabmin = key->BlkStabMin;

/* Perform a subsampling if necessary. */
  if (key->SubSampling) {
    blkpix = samtimes * samtimes;
    for (by=0; by<subhgt; by++) {
      for (bx=0; bx<subwdh; bx++) {
```

```
      itmp = 0;
      for (py=0; py<samtimes; py++)
        for (px=0; px<samtimes; px++)
          itmp += imgin[samtimes * by + py][samtimes * bx + px];
        imgsub[by][bx] = itmp / blkpix;
      }
    }
  }
/* Otherwise, just assign imgin to imgsub. */
else imgsub = imgin;

/* Check for blank or near-blank input images. */
if (key->ChkBlankImg) {
  /* Find the mean and stddev of the image. */
  GET_MEAN_STDDEV(imgsub, 0, 0, subwdh-1, subhgt-1, &mean, &stddev);
  /* Check and reject any flat and blank input image by skipping */
  /* any input image with a stddev lower than FrmInpDevMin. */
  if (stddev < key->FrmInpDevMin) return;
  /* Over-exposed blank input image usually exhibits high mean-to-stddev */
  /* ratio also. Reject the frame if mean/stddev > FrmMTSMax. */
  if ((mean / stddev) > key->FrmMTSMax) return;
}

/* Perform a pixel flooring operation on imgin to shift the pixel */
/* intensity so that they start with zero. This step is necessary */
/* because the data from some FLIR cameras produce pixel values that */
/* hover high-up between the 8100 and 8250, but only within a very */
/* small dynamic range (about 100). The contrast level is not changed */
/* in this operation, as it does in the histogram equalization process, */
/* therefore this operation will NOT introduce unwanted big mean shift */
/* when bright objects enter or exit the scene. */
if (key->PixFlooring) PIXEL_FLOORING(imgsub, imgsub, subwdh, subhgt);

/* Smoothen the input image if necessary. Perform a median filtering */
/* to remove noisy speckles and flatten noisy near-blank background. */
/* The 3x3 filtered image is returned as imgsmth. */
if (key->MedianFilter) MEDIAN_FILTER(imgsub, imgsmth, subwdh, subhgt, 3, 3);
/* Otherwise, simply copy the imgsub to imgsmth. */
else imgsmth = imgsub;

/* Save the first meaningful input frame as the canonical image. */
if (first == 1) {
  /* Copy imgsmth to all slots of imgcan, imgavg[0], and imgavg[1]. */
  /* Set the imgavg[2] to -1000 for later update. */
  for (by=0; by<subhgt; by++) {
    for (bx=0; bx<subwdh; bx++) {
```

```
      imgavg[0][by][bx] = imgavg[1][by][bx] = (float) imgsmth[by][bx];
      imgavg[2][by][bx] = -1000.0;
      for (bw=0; bw<4*ncanhist; bw++)
        imgcan[bw][by][bx] = imgsmth[by][bx];
    }
  }
  /* Falsify the First-Frame status. */
  first = 0;
  /* Get the next frame. */
  return;
}

/* Check for shaking between frames. Noticeable shaking of camera */
/* could induce a lot of false alarms. */
if (key->JitterCheck) {
  MEASURE_JITTER(imgavg[0], imgsmth, subwdh, subhgt, key, &xmvt, &ymvt);
  /* Compute the difference between smoothened input and average images */
  /* with adjustment to the amount of jitter measured. */
  for (by=0; by<subhgt; by++) {
    for (bx=0; bx<subwdh; bx++) {
      /* Compensate the movement of new frame. */
      if (((by - ymvt) < 0) || ((by - ymvt) >= subhgt) ||
          ((bx - xmvt) < 0) || ((bx - xmvt) >= subwdh))
        imgdif[by][bx] = 0;
      else imgdif[by][bx] = (short)
            (((float) imgsmth[by-ymvt][bx-xmvt] - imgavg[0][by][bx]) *
            ((float) imgsmth[by-ymvt][bx-xmvt] - imgavg[1][by][bx]));
    }
  }
}
else {
  /* Compute the difference between smoothened input and average images */
  /* without any adjustment. */
  for (by=0; by<subhgt; by++)
    for (bx=0; bx<subwdh; bx++)
      imgdif[by][bx] = (short)
         (((float) imgsmth[by][bx] - imgavg[0][by][bx]) *
         ((float) imgsmth[by][bx] - imgavg[1][by][bx]));
}

/* Find the mean and stddev of each partition. Update the counter */
/* for block changes and other information of block. */
blkchg = 0;
for (by=0; by<blkcty; by++) {
  for (bx=0; bx<blkctx; bx++) {
    GET_MEAN_STDDEV(imgdif, bx*blkszx, by*blkszy, bx*blkszx+blkszx-1,
```

```
            by*blkszy+blkszy-1, &mean, &stddev);
 /* Update the block and blkchg. */
 block[by][bx].mean = mean;
 block[by][bx].stddev = stddev;
 if (mean < key->BlkMeanMin) {
  block[by][bx].active = 0;
  /* Increase the stability index, if it is less than stabmax. */
  if (block[by][bx].stable < stabmax)
    block[by][bx].stable += 1;
 }
 else {
  blkchg += 1;
  block[by][bx].active = 1;
  /* Decrease the stability index, if it is greater than 0. */
  if (block[by][bx].stable > 0)
    block[by][bx].stable -= 1;
  }
 }
}

/* If nothing significant has changed between the frames, declare */
/* no detection and skip the two tracking steps below. */
if (!blkchg) ndet = 0;
/* Otherwise, probe the difference image further. */
else {
 /* Finding the sum of local means on imgdif to produce imgpyr. */
 PYRAMID_MEANS_BLOCK(imgdif, imgpyr, imgcum, subwdh, subhgt, block,
          blkctx, blkcty, blkszx, blkszy);
 /* Detect the potential moving targets in a frame. */
 DETECT_TARGET(imgpyr, subwdh, subhgt, block, objmap, detect, &ndet, key);
}

/* By default, set nchg=0 for nothing to be shown. */
nchg = 0;
/* Show the slow changes if needed. */
if (key->ChgShow) {
 /* Update the change detection reference background image */
 /* after it has first stabilized. */
 if (initchgbackgd < totblk) {
  /* If an input block is stable and the corresponding block in */
  /* imgavg[2] is yet to be initialized, then update it. */
  for (by=0; by<blkcty; by++) {
   for (bx=0; bx<blkctx; bx++) {
    if ((block[by][bx].stable > stabmin) &&
      (imgavg[2][by*blkszy][bx*blkszx] == -1000.0)) {
     /* Copy the most recent buffer of this block to imgavg[2]. */
```

```
          for (py=by*blkszy; py<(by+1)*blkszy; py++)
            for (px=bx*blkszx; px<(bx+1)*blkszx; px++)
              imgavg[2][py][px] = (float) imgcan[cancur][py][px];
          /* Increment the initchgbackgd counter. */
          initchgbackgd++;
        }
      }
    }
  }
  /* Reset the reference background image, if necessary. */
  else if (key->ChgUpdate) {
    /* Copy the current background to the change detection background. */
    for (by=0; by<subhgt; by++)
      for (bx=0; bx<subwdh; bx++)
        imgavg[2][by][bx] = imgavg[0][by][bx];
  }
  /* Otherwise, look for changes between current and previous background. */
  else {
    /* Compare the current background with previous background image. */
    for (by=0; by<subhgt; by++)
      for (bx=0; bx<subwdh; bx++)
        imgdif[by][bx] = (short) ((imgavg[2][by][bx] - imgavg[0][by][bx])
                    * (imgavg[2][by][bx] - imgavg[1][by][bx]));
    /* Finding the sum of local means on imgdif to produce imgpyr. */
    PYRAMID_MEANS_ALL(imgdif, imgpyr, imgcum, subwdh, subhgt);
    /* Detect the potential moving targets in a frame. */
    DETECT_CHANGE(imgpyr, subwdh, subhgt, objmap, change, &nchg, key);
  }
}

/* Increment the cancur counter until it hits key->NCanHist. */
/* The new cancur will point to the oldest slot. */
cancur += 1;
if (cancur == ncanhist) cancur = 0;
/* Update the average images based on imgsmth and previous cannonical images. */
/* Note that 4 set of cannonical images are kept in imgcan. The first set is */
/* the most recent frames and always updated by imgsmth. It is a buffer between */
/* the current frame and the first average image. The second set is updated by */
/* the oldest frame in the first buffer, which is used to compute the first */
/* average image, imgavg[0]. The third set is used as a buffer zone to separate */
/* the content of the two average images. It is updated by the oldest frame */
/* from the second set of connonical images. The fourth set is used to compute */
/* the imgavg[1] and it is updated by the oldest frame from the third set of */
/* cannonical images. The buffer zone provided by the first and third set of */
/* cannonical images prevent the interaction of trailing effects when the */
/* imgdif is computed. */
```

```
/* First we update the imgavg and the last three sets of cannonical images. */
for (by=0; by<subhgt; by++) {
  for (bx=0; bx<subwdh; bx++) {
    imgavg[1][by][bx] += (float) ((imgcan[2*ncanhist+cancur][by][bx]
      - imgcan[3*ncanhist+cancur][by][bx]) / ((float) ncanhist));
    imgcan[3*ncanhist+cancur][by][bx] = imgcan[2*ncanhist+cancur][by][bx];
    imgcan[2*ncanhist+cancur][by][bx] = imgcan[ncanhist+cancur][by][bx];
    imgavg[0][by][bx] += (float) ((imgcan[cancur][by][bx]
      - imgcan[ncanhist+cancur][by][bx]) / ((float) ncanhist));
    imgcan[ncanhist+cancur][by][bx] = imgcan[cancur][by][bx];
  }
}
/* Then the first set of cannonical images (first buffer) is updated. */
/* Since the imgsmth is involved in this step, we have to check whether or */
/* not the key->JitterCheck has been set and act accordingly. */
/* Local big changes are avoided to be incorporated into the background */
/* model, because they are usually the big moving targets and capable of */
/* ruining the background model. */
if (key->JitterCheck) {
  for (by=0; by<blkcty; by++) {
    for (bx=0; bx<blkctx; bx++) {
      /* If the current block was stable before but suddenly active, */
      /* skip it to prevent it from messing up the background model. */
      if (block[by][bx].active && (block[by][bx].stable >= stabmin))
        continue;
      /* Otherwise, copy imgsmth to imgcan. Compensate the movement of */
      /* new frame by updating only the area covered by the original */
      /* field of view. */
      for (py=by*blkszy; py<by*blkszy+blkszy; py++) {
        for (px=bx*blkszx; px<bx*blkszx+blkszx; px++) {
          if (!(((py - ymvt) < 0) || ((py - ymvt) >= subhgt) ||
              ((px - xmvt) < 0) || ((px - xmvt) >= subwdh))) {
            imgcan[cancur][py][px] = imgsmth[py-ymvt][px-xmvt];
          }
        }
      }
    }
  }
}
/* Otherwise, replace the oldest image in first buffer without shifting. */
else {
  for (by=0; by<blkcty; by++) {
    for (bx=0; bx<blkctx; bx++) {
      /* If the current block was stable before but suddenly active, */
      /* skip it to prevent it from messing up the background model. */
      if (block[by][bx].active && (block[by][bx].stable >= stabmin))
```

```
        continue;
      /* Otherwise, just copy imgsmth to imgcan. */
      else {
        for (py=by*blkszy; py<by*blkszy+blkszy; py++)
          for (px=bx*blkszx; px<bx*blkszx+blkszx; px++)
            imgcan[cancur][py][px] = imgsmth[py][px];
        }
      }
    }
  }

/* Various output activities depending on key->VerbInt. */
  /* First show the detection results, if needed. */
  if (key->VerbInt <= 3) {
    printf("Detections of %s_f%04d\n", basename, frm);
    for (det=0; det<ndet; det++)
      printf("det %d: xloc= %d yloc= %d val= %f hgt= %d wdh= %d\n",
          det+1, detect[det].xloc, detect[det].yloc, detect[det].confval,
          detect[det].hgt, detect[det].wdh);
    if (key->ChgShow) {
      printf("Slow changes observed at\n");
      for (chg=0; chg<nchg; chg++)
        printf("chg %d: xloc= %d yloc= %d val= %f hgt= %d wdh= %d\n",
            chg+1, change[chg].xloc, change[chg].yloc, change[chg].confval,
            change[chg].hgt, change[chg].wdh);
    }
    printf("\n");
  }

/* Save the intermediate images and show detection info, if needed. */
  /* If key->VerbInt == 1 and 2, mark the detections and save marked images. */
  if ((key->VerbInt == 1) || (key->VerbInt == 2)) {
    /* Mark detections on input image. */
    MARK_DETECTION(imgin, key->FrmColSize, key->FrmRowSize, detect, ndet);
    /* Write the marked image. */
    sprintf(stmp, "%s/mrk_%s_f%04d.%s", key->LocOutFiles, basename, frm,
        key->FrmFormat);
    WRITE_IMAGE(stmp, imgin, key->FrmColSize, key->FrmRowSize, key->FrmFormat);

/* If key->VerbInt == 2, save the other intermediate images also. */
    if (key->VerbInt == 2) {
      /* Write the imgsmth. */
      sprintf(stmp, "%s/smth_%s_f%04d.%s", key->LocOutFiles, basename, frm,
          key->FrmFormat);
      WRITE_IMAGE(stmp, imgsmth, subwdh, subhgt, key->FrmFormat);
    }
```

```
}
/* For Qt interface, these operations are needed. */
else if (key->VerbInt == 3) {
  sprintf(stmp, "%s_f%04d", basename, frm);
  fputc(1, stdout); // Tells GUI that we begin frame's output.
  fputc(strlen(stmp), stdout); // Write length of name.
  printf("%s", stmp); // Write name.
  fputc(ndet, stdout); // Write number of detections.
  for (det=0; det<ndet; det++) {
    // Write detections.
    fputc(detect[det].xloc >> 8, stdout); // Most significant 8.
    fputc(detect[det].xloc, stdout); // Least significant 8.
    fputc(detect[det].yloc >> 8, stdout); // Most significant 8.
    fputc(detect[det].yloc, stdout); // Least significant 8.
    fputc(detect[det].hgt >> 8, stdout); // Most significant 8.
    fputc(detect[det].hgt, stdout); // Least significant 8.
    fputc(detect[det].wdh >> 8, stdout); // Most significant 8.
    fputc(detect[det].wdh, stdout); // Least significant 8.
    /* Send the confval in integer format. */
    itmp = (int) detect[det].confval;
    fputc(itmp >> 8, stdout); // Most significant 8.
    fputc(itmp, stdout); // Least significant 8.
  }
  fputc(nchg, stdout); // Write number of changes.
  for (chg=0; chg<nchg; chg++) {
    // Write changes.
    fputc(change[chg].xloc >> 8, stdout); // Most significant 8.
    fputc(change[chg].xloc, stdout); // Least significant 8.
    fputc(change[chg].yloc >> 8, stdout); // Most significant 8.
    fputc(change[chg].yloc, stdout); // Least significant 8.
    fputc(change[chg].hgt >> 8, stdout); // Most significant 8.
    fputc(change[chg].hgt, stdout); // Least significant 8.
    fputc(change[chg].wdh >> 8, stdout); // Most significant 8.
    fputc(change[chg].wdh, stdout); // Least significant 8.
    /* Send the confval in integer format. */
    itmp = (int) change[chg].confval;
    fputc(itmp >> 8, stdout); // Most significant 8.
    fputc(itmp, stdout); // Least significant 8.
  }

/* Output jpeg to stream. */
  sprintf(stmp, "%s/%s", key->LocFrmFiles, imgfname);
  if ((v5file = fopen(stmp, "rb")) == NULL) {
    printf("\nError! Can't open %s\n\n", stmp);
    exit(1);
  }
```

```c
/* Get the size of the image. */
bx = ftell(v5file);
fseek(v5file, 0, SEEK_END);
by = ftell(v5file);
bw = by - bx;
/* Write the image size to stdout. */
fwrite(&bw, sizeof(int), 1, stdout);
/* Rewind. */
fseek(v5file, 0, SEEK_SET);
/* Write jpeg. */
while((v5bytes = fread(v5buf, sizeof(char), 1024, v5file)) > 0) {
  fwrite(v5buf, sizeof(char), v5bytes, stdout);
}

/* Close file. */
fclose(v5file);
/* Flush output. */
fflush(stdout);
/* GUI sends info to FPSS. Remove while testing threading. */
fgets(stmp, stmpbytes, stdin);
QT_UPDATE(key, stmp, argarr, objmap);
  }

}

/*******************************************************************/
/* Perform a linear pixel flooring operation by making the minimum pixel as    */
/* zero and shift all other pixel values by the same amount. The original      */
/* contrast of the imgin is preserved hower. The floored image is returned     */
/* as imgout.                                                                  */
/*******************************************************************/ void PIXEL_FLOORING(short imgin, short imgout, int wdh, int hgt)
{ int bx, by, pixmin, pixmax;

/* Initialize the pixmin and pixmax. */
  pixmin = 30000;
  pixmax = -30000;

/* Find the origial minimum and maximum pixel values. */
  for (by=0; by<hgt; by++) {
    for (bx=0; bx<wdh; bx++) {
```

```
      if (pixmin > imgin[by][bx]) pixmin = imgin[by][bx];
      if (pixmax < imgin[by][bx]) pixmax = imgin[by][bx];
    }
  }

/* Floor the imgin into imgout. */
  for (by=0; by<hgt; by++)
    for (bx=0; bx<wdh; bx++)
      imgout[by][bx] = imgin[by][bx] - pixmin;

}

/**********************************************************************/
/* Perform a non-linear median filtering on img1 by replacing the value of a   */
/* pixel with the median value of its winx x winy neighborhood. The filtered   */
/* image is returned as img2.                                                  */
/**********************************************************************/ void MEDIAN_FILTER(short img1, short img2, int wdh, int hgt, int winx,
           int winy)
{ int bx, by, cnt, px, py, midcnt, halfx, halfy;
  short *holder, sitmp;

/* Make sure the winx and winy are odd numbers. */
  if (((winx % 2) == 0) || ((winy % 2) == 0)) {
    printf("\nThe width (%d) and height (%d) of the ", winx, winy);
    printf("median filter window must be odd numbers.\n\n");
    exit(1);
  }

/* Allocate memory. */
  holder = (short *) calloc((winx * winy), sizeof(short));
  /* Initialize local variables. */
  halfx = (winx - 1) / 2;
  halfy = (winy - 1) / 2;

/* Find the median value at each pixel location. */
  /* The size of filter is smaller around the boundaries. */
  for (by=0; by<hgt; by++) {
    for (bx=0; bx<wdh; bx++) {
      /* Collecting the pixels available inside the neighborhood. */
      for (cnt=0,py=by-halfy; py<=by+halfy; py++) {
```

```
      for (px=bx-halfx; px<=bx+halfx; px++) {
        /* Make sure the point is inside the image. */
        if ((py >= 0) && (px >= 0) && (py < hgt) && (px < wdh)) {
          holder[cnt] = img1[py][px];
          cnt++;
        }
      }
    }
    midcnt = cnt / 2;
    /* Sort the holder to find the median value. */
    for (py=0; py<midcnt; py++) {
      for (px=py+1; px<cnt; px++) {
        if (holder[py] > holder[px]) {
          sitmp = holder[py];
          holder[py] = holder[px];
          holder[px] = sitmp;
        }
      }
    }
    /* Apply the median value to the current pixel. */
    img2[by][bx] = holder[midcnt-1];
  }
}

/* Free memory. */
free(holder);

}

/*****************************************************************/
/* Compute the sum of npyramid local means based on 3 different rectangular   */
/* neighborhoods surrounding each pixel in img1. The resulting mean images    */
/* are stacked and returned to the calling function as img2. This function    */
/* is tailored for block-based operation.                                     */
/*****************************************************************/ void PYRAMID_MEANS_BLOCK(short img1, float img2, int **imgcum, int wdh,
            int hgt, struct Partition **block, int blkctx,
            int blkcty, int blkszx, int blkszy)
{ int bx, by, dx, dy, pyr, bxmin, bxmax, bymin, bymax, npyramid=3, itmp;
  int sizex[3] = {1, 2, 3}, sizey[3] = {1, 3, 5}; /* Sizes of 3 rectangles. */

/* Fill up the imgcum. Begin with top-left corner. */
```

```
    imgcum[0][0] = (int) img1[0][0];
    /* Then the left edge. */
    for (by=1; by<hgt; by++)
      imgcum[by][0] = (int) (img1[by][0] + imgcum[by-1][0]);
    /* Then the top row. */
    for (bx=1; bx<wdh; bx++)
      imgcum[0][bx] = (int) (img1[0][bx] + imgcum[0][bx-1]);
    /* Then the rest of the image. */
    for (by=1; by<hgt; by++)
      for (bx=1; bx<wdh; bx++)
        imgcum[by][bx] = (int) (img1[by][bx] + imgcum[by-1][bx] + imgcum[by][bx-1]
                - imgcum[by-1][bx-1]);

/* Compute 3 different local means and store them in img2. */
    for (by=0; by<blkcty; by++) {
      for (bx=0; bx<blkctx; bx++) {
        if (block[by][bx].active) {
          for (dy=by*blkszy; dy<by*blkszy+blkszy; dy++) {
            for (dx=bx*blkszx; dx<bx*blkszx+blkszx; dx++) {
              /* Reset the temporary holder itmp. */
              itmp = 0;
              for (pyr=0; pyr<npyramid; pyr++) {
                bxmin = MAX(dx-sizex[pyr]-1, 0);
                bxmax = MIN(dx+sizex[pyr], wdh-1);
                bymin = MAX(dy-sizey[pyr]-1, 0);
                bymax = MIN(dy+sizey[pyr], hgt-1);
                itmp += ((imgcum[bymax][bxmax] + imgcum[bymin][bxmin]
                        - imgcum[bymax][bxmin] - imgcum[bymin][bxmax])
                    / ((bymax - bymin) * (bxmax - bxmin)));
              }
              /* Assign itmp to img2 as output. */
              img2[dy][dx] = (float) itmp;
            }
          }
        }
      }
    }

}

/**********************************************************************/
/* Compute the sum of npyramid local means based on 3 different rectangular */
/* neighborhoods surrounding each pixel in img1. The resulting mean images  */
/* are stacked and returned to the calling function as img2. This function */
/* is tailored for whole image operation.                                  */
/**********************************************************************/
```

```c
void PYRAMID_MEANS_ALL(short **img1, float **img2, int **imgcum, int wdh, int hgt)
{
  int bx, by, dx, dy, pyr, bxmin, bxmax, bymin, bymax, npyramid=3, itmp;
  int sizex[3] = {1, 2, 3}, sizey[3] = {1, 3, 5}; /* Sizes of 3 rectangles. */

/* Fill up the imgcum. Begin with top-left corner. */
  imgcum[0][0] = (int) img1[0][0];
  /* Then the left edge. */
  for (by=1; by<hgt; by++)
    imgcum[by][0] = (int) (img1[by][0] + imgcum[by-1][0]);
  /* Then the top row. */
  for (bx=1; bx<wdh; bx++)
    imgcum[0][bx] = (int) (img1[0][bx] + imgcum[0][bx-1]);
  /* Then the rest of the image. */
  for (by=1; by<hgt; by++)
    for (bx=1; bx<wdh; bx++)
      imgcum[by][bx] = (int) (img1[by][bx] + imgcum[by-1][bx] + imgcum[by][bx-1]
              - imgcum[by-1][bx-1]);

/* Compute 3 different local means and store them in img2. */
  for (dy=0; dy<hgt; dy++) {
    for (dx=0; dx<wdh; dx++) {
      /* Reset the temporary holder itmp. */
      itmp = 0;
      for (pyr=0; pyr<npyramid; pyr++) {
        bxmin = MAX(dx-sizex[pyr]-1, 0);
        bxmax = MIN(dx+sizex[pyr], wdh-1);
        bymin = MAX(dy-sizey[pyr]-1, 0);
        bymax = MIN(dy+sizey[pyr], hgt-1);
        itmp += ((imgcum[bymax][bxmax] + imgcum[bymin][bxmin]
              - imgcum[bymax][bxmin] - imgcum[bymin][bxmax])
              / ((bymax - bymin) * (bxmax - bxmin)));
      }
      /* Assign itmp to img2 as output. */
      img2[dy][dx] = (float) itmp;
    }
  }
}

/************************************************************************/
/* Compute the mean and stddev for a given image patch specified by the box  */
/* defined by top-left corner [x1,y1] and bottom-right corner [x2,y2].       */
/************************************************************************/
```

```c
void GET_MEAN_STDDEV(short **img, int x1, int y1, int x2, int y2, float *mean,
            float *stddev)
{ int bx, by, size;
  double sum, sqsum;

/* Find the mean and stddev. */
  sum = sqsum = 0.0;
  for (by=y1; by<=y2; by++) {
    for (bx=x1; bx<=x2; bx++) {
      sum += (double) img[by][bx];
      sqsum += (double) SQ(img[by][bx]);
    }
  }
  size = (x2 - x1 + 1) * (y2 - y1 + 1);
  *mean = (float) (sum / (double) size);
  *stddev = (float) (sqrt((sqsum / (double) (size - 1)) -
            ((sum / (double) (size)) * (sum / (double) (size - 1)))));
  if (*stddev < 0.001) {
    // printf("\n Extremely small stddev (%f) encountered!!\n\n", *stddev);
    *stddev = 0.001;
  }

} .

/*********************************************************************/
/* Detect the jittering of new frame relative to the reference frame in X    */
/* and Y direction. Return the findings as xmvt and ymvt.                    */
/*********************************************************************/
void MEASURE_JITTER(float **reffrm, short **newfrm, int wdh, int hgt,
            struct Params *key, int *xmvt, int *ymvt)
{ int bx, by, cx, cy, px, py, rx, ry, *distx, *disty, maxfreq, padszx, padszy,
    ***padmvt, totpad;
  float freqthrd=0.5, padjpx, padjpy, paddif, padmin;

/* Compute the size and jumping step of pads to check shaking frames. */
  /* The size is half of the real pad to ease calculation later. */
  padszx = key->JitPadSzX / 2;
  padszy = key->JitPadSzY / 2;
  padjpx = wdh / (float) (key->JitPadNumX + 1);
```

```
padjpy = hgt / (float) (key->JitPadNumY + 1);
totpad = key->JitPadNumX * key->JitPadNumY;

/* Allocate memory for distribution and movement recorders. */
distx =(int *) calloc((2 * key->JitPadRngX + 1), sizeof(int));
disty =(int *) calloc((2 * key->JitPadRngY + 1), sizeof(int));
padmvt = (int ***) calloc(key->JitPadNumY, sizeof(int **));
for (by=0; by<key->JitPadNumY; by++) {
  padmvt[by] = (int **) calloc(key->JitPadNumX, sizeof(int *));
  for (bx=0; bx<key->JitPadNumX; bx++)
    padmvt[by][bx] = (int *) calloc(2, sizeof(int));
}

/* Check at all predefined pad locations. */
for (by=0; by<key->JitPadNumY; by++) {
 for (bx=0; bx<key->JitPadNumX; bx++) {
  /* Set the local variables. */
  padmin = 1000000000.0;
  padmvt[by][bx][0] = padmvt[by][bx][1] = 0;
  cx = (int) (padjpx * (bx + 1));
  cy = (int) (padjpy * (by + 1));
  /* Comparing the pad at all movements within the ranges. */
  for (ry=-key->JitPadRngY; ry<=key->JitPadRngY; ry++) {
   for (rx=-key->JitPadRngX; rx<=key->JitPadRngX; rx++) {
    /* Skip the comparison if part of the pad is outside of */
    /* the standard image. */
    if (((cy + ry - padszy) < 0) || ((cy + ry + padszy) >= hgt) ||
        ((cx + rx - padszx) < 0) || ((cx + rx + padszx) >= wdh))
      continue;
    /* Otherwise, reset and sum up the paddif for this move. */
    paddif = 0.0;
    for (py=-padszy; py<padszy; py++)
     for (px=-padszx; px<padszx; px++)
       paddif += fabs(reffrm[cy+ry+py][cx+rx+px] -
              ((float) newfrm[cy+py][cx+px]));
    /* Keep track of the best match between the moves. */
    if (padmin > paddif) {
     padmin = paddif;
     padmvt[by][bx][0] = rx;
     padmvt[by][bx][1] = ry;
    }
   }
  }
 }
}
```

```c
/* Find the most common movement in X and Y directions. */
/* First reset the distribution accummulators. */
for (bx=0; bx<(2 * key->JitPadRngX + 1); bx++) distx[bx] = 0;
for (by=0; by<(2 * key->JitPadRngY + 1); by++) disty[by] = 0;
/* Then run through the padmvt recorder. */
for (by=0; by<key->JitPadNumY; by++) {
  for (bx=0; bx<key->JitPadNumX; bx++) {
    distx[padmvt[by][bx][0] + key->JitPadRngX] += 1;
    disty[padmvt[by][bx][1] + key->JitPadRngY] += 1;
  }
}
/* Pick the most frequent horizontal movement and check the reliability */
/* of this finding. */
maxfreq = -1000000000;
for (bx=0; bx<(2 * key->JitPadRngX + 1); bx++) {
  if (maxfreq < distx[bx]) {
    maxfreq = distx[bx];
    *xmvt = bx - key->JitPadRngX;
  }
}
if ((key->VerbInt == 2) && (maxfreq < (totpad * freqthrd))) {
  printf("\n\nWarning! Horizontal jitter (%d) is not reliable.", *xmvt);
  printf("\nIt represents only %d of the %d places measured.\n\n",
      maxfreq, totpad);
}
/* Pick the most frequent vertical movement and check the reliability */
/* of this finding. */
maxfreq = -1000000000;
for (by=0; by<(2 * key->JitPadRngY + 1); by++) {
  if (maxfreq < disty[by]) {
    maxfreq = disty[by];
    *ymvt = by - key->JitPadRngY;
  }
}
if ((key->VerbInt == 2) && (maxfreq < (totpad * freqthrd))) {
  printf("\n\nWarning! Vertical jitter (%d) is not reliable.", *ymvt);
  printf("\nIt represents only %d of the %d places measured.\n\n",
      maxfreq, totpad);
}

/* Free memory. */
for (by=0; by<key->JitPadNumY; by++) {
  for (bx=0; bx<key->JitPadNumX; bx++)
    free(padmvt[by][bx]);
  free(padmvt[by]);
}
```

```
      free(padmvt);
      free(distx);
      free(disty);

}

/*******************************************************************/
/*   Detect the most likely moving target locations on a given input frame.    */
/*******************************************************************/ void DETECT_TARGET(float imgpyr, int wdh, int hgt, struct Partition block,
            char *objmap, struct Point *detect, int *ndet,
            struct Params *key)
{
   int bx, by, dx, dy, det, bxmin, bymin, bxmax, bymax, samtimes, yshift,
      xcent1, ycent1, xcent2, ycent2, xdir1, ydir1, xdir2, ydir2, xtip, ytip,
      minbox, blkctx, blkcty, blkszx, blkszy, stabmin;
   char pix_current, pix_line, pix_ignore, pix_critical;
   float crit_boost, edgethsd, maxval;

/* Initialize variables. */
   *ndet = 0;
   pix_line = 1;
   pix_ignore = 2;
   pix_critical = 4;
   blkctx = key->NBlockX;
   blkcty = key->NBlockY;
   blkszx = wdh / blkctx;
   blkszy = hgt / blkcty;
   crit_boost = key->CritRegBoost;
   edgethsd = key->DetEdgeThrd;
   samtimes = key->SubSamTimes;
   stabmin = key->BlkStabMin;
   minbox = MAX(1, (10 / samtimes));

/* Adjust the values of imgpyr accordingly. */
   for (by=0; by<hgt; by++) {
      yshift = by * wdh * samtimes;
      for (bx=0; bx<wdh; bx++) {
         /* Get the current pixel of objmap from GUI. */
         pix_current = objmap[(yshift + bx) * samtimes];
         /* Suppress the peak in the area set by objmap as to be ignored. */
         if (pix_current & pix_ignore) imgpyr[by][bx] = 0.0;
```

```
    /* Boost the peak in the area set by objmap as to be critical. */
    if (pix_current & pix_critical) imgpyr[by][bx] *= crit_boost;
  }
}

/* Find the valid detections. */
for (det=0; det<key->DetNumMax; det++) {
  /* Reset to the default values. */
  maxval = -100000.0;
  xcent1 = ycent1 = 0;
  /* Find the current maximum value on the active blocks. */
  for (by=0; by<blkcty; by++) {
    for (bx=0; bx<blkctx; bx++) {
      if (block[by][bx].active && (block[by][bx].stable >= stabmin)) {
        for (dy=by*blkszy; dy<by*blkszy+blkszy; dy++) {
          for (dx=bx*blkszx; dx<bx*blkszx+blkszx; dx++) {
            if (maxval < imgpyr[dy][dx]) {
              maxval = imgpyr[dy][dx];
              xcent1 = dx;
              ycent1 = dy;
            }
          }
        }
      }
    }
  }

/* See if the maxval is acceptably high. If not, stop and return. */
  if (maxval < key->DetActThrd) return;
  /* Otherwise, validate the latest detection. */
  else *ndet += 1;

/* Initialize some local variables. */
  bxmin = MAX(xcent1-minbox, 0);
  bxmax = MIN(xcent1+minbox, wdh-1);
  bymin = MAX(ycent1-minbox, 0);
  bymax = MIN(ycent1+minbox, hgt-1);

/* Estimate the height and width of the detected object by checking the */
  /* big value drop in 16 directions from the detected location. */
  for (ydir1=-2; ydir1<3; ydir1++) {
    for (xdir1=-2; xdir1<3; xdir1++) {
      /* Use only the non-redundant directional vectors. */
      if ((abs(xdir1) < 2) && (abs(ydir1) < 2)) continue;
      /* Always start from the center point. */
      bx = xcent1;
```

```
  by = ycent1;
  /* Check this direction. */
  while (imgpyr[by][bx] > edgethsd) {
    if (bxmin > bx) bxmin = bx;
    if (bxmax < bx) bxmax = bx;
    if (bymin > by) bymin = by;
    if (bymax < by) bymax = by;
    bx += xdir1;
    by += ydir1;
    /* Avoid stepping out of the image. */
    if ((bx < 0) || (by < 0) || (bx >= wdh) || (by >= hgt)) break;
  }
  /* Back-track to previous valid point, or segmentation fault may occurs. */
  bx -= xdir1;
  by -= ydir1;

/* If the distance moved in this direction is far, then perform */
  /* another 8 directional search near the end of this direction. */
  if ((SQ(bx - xcent1) + SQ(by - ycent1)) > 25) {
    /* Define the focus point of this tip. */
    xtip = xcent1 + (int) (0.8 * (bx - xcent1));
    ytip = ycent1 + (int) (0.8 * (by - ycent1));
    /* Search 8 directions. */
    for (ydir2=-1; ydir2<2; ydir2++) {
      for (xdir2=-1; xdir2<2; xdir2++) {
        /* Avoid the non-moving [0,0] vector. */
        if ((xdir2 == 0) && (ydir2 == 0)) continue;
        /* Always start from the same tip. */
        dx = xtip;
        dy = ytip;
        /* Check this direction. */
        while (imgpyr[dy][dx] > edgethsd) {
          if (bxmin > dx) bxmin = dx;
          if (bxmax < dx) bxmax = dx;
          if (bymin > dy) bymin = dy;
          if (bymax < dy) bymax = dy;
          dx += xdir2;
          dy += ydir2;
          /* Avoid stepping out of the image. Backtracking is not */
          /* necessary in this case, because the dx and dy will not */
          /* be used again. So no segmentation fault could occur. */
          if ((dx < 0) || (dy < 0) || (dx >= wdh) || (dy >= hgt)) break;
        }
      }
    }
  }
}
```

```
    }
  }

/* Compute a new center location based on the newly acquired height and width. */
  /* Move the detected point to the new center of the blob if acceptable. */
  xcent2 = (bxmax + bxmin) / 2;
  ycent2 = (bymax + bymin) / 2;
  if (imgpyr[ycent2][xcent2] > edgethsd) {
    xcent1 = xcent2;
    ycent1 = ycent2;
  }

/* Record the information to detect pointer. */
  detect[det].xloc = xcent1;
  detect[det].yloc = ycent1;
  detect[det].hgt = bymax - bymin;
  detect[det].wdh = bxmax - bxmin;
  detect[det].confval = maxval;
  /* If key->SubSampling = 1, correct the detected locations and */
  /* estimated object size with respect to original image size. */
  if (key->SubSampling) {
    detect[det].xloc *= samtimes;
    detect[det].yloc *= samtimes;
    detect[det].hgt *= samtimes;
    detect[det].wdh *= samtimes;
  }

/* Suppress the neighborhood of the newly selected detection */
  /* before going back to search for the next detection. */
  for (by=bymin; by<=bymax; by++)
    for (bx=bxmin; bx<=bxmax; bx++)
      imgpyr[by][bx] = 0.0;
  }

}

/**************************************************************************/
/*  Detect the changes took place between the two reference images.       */
/**************************************************************************/ void DETECT_CHANGE(float **imgpyr, int wdh, int hgt, char *objmap,
           struct Point *change, int *nchg, struct Params *key)
{
```

```
int bx, by, dx, dy, det, bxmin, bymin, bxmax, bymax, samtimes, yshift,
   xcent1, ycent1, xcent2, ycent2, xdir1, ydir1, xdir2, ydir2, xtip, ytip,
   minbox;
char pix_current, pix_line, pix_ignore, pix_critical;
float crit_boost, edgethsd, maxval;

/* Initialize variables. */
*nchg = 0;
pix_line = 1;
pix_ignore = 2;
pix_critical = 4;
crit_boost = key->CritRegBoost;
edgethsd = key->ChgEdgeThrd;
samtimes = key->SubSamTimes;
minbox = MAX(1, (10 / samtimes));

/* Adjust the values of imgpyr accordingly. */
for (by=0; by<hgt; by++) {
  yshift = by * wdh * samtimes;
  for (bx=0; bx<wdh; bx++) {
    /* Get the current pixel of objmap from GUI. */
    pix_current = objmap[(yshift + bx) * samtimes];
    /* Suppress the peak in the area set by objmap as to be ignored. */
    if (pix_current & pix_ignore) imgpyr[by][bx] = 0.0;
    /* Boost the peak in the area set by objmap as to be critical. */
    if (pix_current & pix_critical) imgpyr[by][bx] *= crit_boost;
  }
}

/* Find the valid changes. */
for (det=0; det<key->ChgNumMax; det++) {
  /* Reset to the default values. */
  maxval = -100000.0;
  xcent1 = ycent1 = 0;
  /* Find the current maximum value on the active blocks. */
  for (dy=0; dy<hgt; dy++) {
    for (dx=0; dx<wdh; dx++) {
      if (maxval < imgpyr[dy][dx]) {
        maxval = imgpyr[dy][dx];
        xcent1 = dx;
        ycent1 = dy;
      }
    }
  }

/* See if the maxval is acceptably high. If not, stop and return. */
```

```
if (maxval < key->ChgActThrd) return;
/* Otherwise, validate the latest detection. */
else *nchg += 1;

/* Initialize some local variables. */
bxmin = MAX(xcent1-minbox, 0);
bxmax = MIN(xcent1+minbox, wdh-1);
bymin = MAX(ycent1-minbox, 0);
bymax = MIN(ycent1+minbox, hgt-1);

/* Estimate the height and width of the detected object by checking the */
/* big value drop in 16 directions from the detected location. */
for (ydir1=-2; ydir1<3; ydir1++) {
  for (xdir1=-2; xdir1<3; xdir1++) {
    /* Use only the non-redundant directional vectors. */
    if ((abs(xdir1) < 2) && (abs(ydir1) < 2)) continue;
    /* Always start from the center point. */
    bx = xcent1;
    by = ycent1;
    /* Check this direction. */
    while (imgpyr[by][bx] > edgethsd) {
      if (bxmin > bx) bxmin = bx;
      if (bxmax < bx) bxmax = bx;
      if (bymin > by) bymin = by;
      if (bymax < by) bymax = by;
      bx += xdir1;
      by += ydir1;
      /* Avoid stepping out of the image. */
      if ((bx < 0) || (by < 0) || (bx >= wdh) || (by >= hgt)) break;
    }
    /* Back-track to previous valid point, or segmentation fault may occurs. */
    bx -= xdir1;
    by -= ydir1;

/* If the distance moved in this direction is far, then perform */
    /* another 8 directional search near the end of this direction. */
    if ((SQ(bx - xcent1) + SQ(by - ycent1)) > 25) {
      /* Define the focus point of this tip. */
      xtip = xcent1 + (int) (0.8 * (bx - xcent1));
      ytip = ycent1 + (int) (0.8 * (by - ycent1));
      /* Search 8 directions. */
      for (ydir2=-1; ydir2<2; ydir2++) {
        for (xdir2=-1; xdir2<2; xdir2++) {
          /* Avoid the non-moving [0,0] vector. */
          if ((xdir2 == 0) && (ydir2 == 0)) continue;
          /* Always start from the same tip. */
```

```
            dx = xtip;
            dy = ytip;
            /* Check this direction. */
            while (imgpyr[dy][dx] > edgethsd) {
              if (bxmin > dx) bxmin = dx;
              if (bxmax < dx) bxmax = dx;
              if (bymin > dy) bymin = dy;
              if (bymax < dy) bymax = dy;
              dx += xdir2;
              dy += ydir2;
              /* Avoid stepping out of the image. Backtracking is not */
              /* necessary in this case, because the dx and dy will not */
              /* be used again. So no segmentation fault could occur. */
              if ((dx < 0) || (dy < 0) || (dx >= wdh) || (dy >= hgt)) break;
            }
          }
        }
      }
    }
  }
}

/* Compute a new center location based on the newly acquired height and width. */
/* Move the detected point to the new center of the blob if acceptable. */
xcent2 = (bxmax + bxmin) / 2;
ycent2 = (bymax + bymin) / 2;
if (imgpyr[ycent2][xcent2] > edgethsd) {
  xcent1 = xcent2;
  ycent1 = ycent2;
}

/* Record the information to change pointer. */
change[det].xloc = xcent1;
change[det].yloc = ycent1;
change[det].hgt = bymax - bymin;
change[det].wdh = bxmax - bxmin;
change[det].confval = maxval;
/* If key->SubSampling = 1, correct the detected locations and */
/* estimated object size with respect to original image size. */
if (key->SubSampling) {
  change[det].xloc *= samtimes;
  change[det].yloc *= samtimes;
  change[det].hgt *= samtimes;
  change[det].wdh *= samtimes;
}

/* Suppress the neighborhood of the newly selected detection */
```

```
/* before going back to search for the next detection. */
for (by=bymin; by<=bymax; by++)
  for (bx=bxmin; bx<=bxmax; bx++)
    imgpyr[by][bx] = 0.0;
  }

}

/**************************************************************************/
/*   Mark the detections on a given image based on detection information.   */
/**************************************************************************/ void MARK_DETECTION(short **img, int wdh, int hgt, struct Point *detect,
            int ndet)
{ int bx, by, px, py, det, crslgt, crswdh;

/* Initialize local variables. */
  crslgt = 6;
  crswdh = 1;

/* Mark the detections on img. */
  for (det=0; det<ndet; det++) {
    bx = detect[det].xloc;
    by = detect[det].yloc;
    /* Put the white cross-hair. */
    for (py=by-crslgt; py<=by+crslgt; py++)
      for (px=-crswdh; px<=crswdh; px++)
        if ((py>=0) && (py<hgt) && ((px+bx)>=0) && ((px+bx)<wdh))
          img[py][px+bx] = 255;
    for (py=-crswdh; py<=crswdh; py++)
      for (px=bx-crslgt; px<=bx+crslgt; px++)
        if ((px>=0) && (px<wdh) && ((py+by)>=0) && ((py+by)<hgt))
          img[py+by][px] = 255;
    /* Put the black cross-hair in the midst of the white one. */
    for (py=by-crslgt+1; py<by+crslgt; py++)
      if ((py>=0) && (py<hgt))
        img[py][bx] = 0;
    for (px=bx-crslgt+1; px<bx+crslgt; px++)
      if ((px>=0) && (px<wdh))
        img[by][px] = 0;
  }
```

}

The second program, referred to as "FPSS.C", is the wrapper program that connects "TRACKING.C" and other component programs together in order to perform the moving target detection and tracking for the video surveillance application.

```c
#include "fpss.h"

/* Function Prototypes. */
void SET_PARAMETERS(struct Params *key, int argc, char *argv[]);
void READ_IMAGE(char *fname, short **img, struct Params *key);
void TRACKING(char *imgfname, short **imgin, short **imgsub, short **imgsmth,
        short imgdif, float imgpyr, int imgcum, short *imgcan,
        float *imgavg, char argarr, char *objmap, int subhgt,
        int subwdh, struct Partition **block, int blkszx, int blkszy,
        struct Point *change, struct Point *detect, struct Params *key);

/**********************************************************************/
/*              Beginning of Main Program                             */
/**********************************************************************/ int main(int argc, char *argv[])
{
   int bw, by, bx, nimgavg, subhgt, subwdh, blkszx, blkszy, **imgcum;
   short **imgin, **imgsub, **imgsmth, **imgdif, ***imgcan;
   char imgfname[80], stmp[150];
   char **argarr, *objmap; // map of locations of alarms drawn in Qt GUI
   float ***imgavg, **imgpyr;
   struct Partition **block;
   struct Point *change, *detect;
   struct Params *key;
   FILE *lsfp;

/* Get arguments from command line. */
   key = (struct Params *) calloc(1, sizeof(struct Params));
   SET_PARAMETERS(key, argc, argv);

/* Initialize local variables. */
   subhgt = key->FrmRowSize;
```

```
subwdh = key->FrmColSize;
if (key->SubSampling) {
  subhgt /= key->SubSamTimes;
  subwdh /= key->SubSamTimes;
}
blkszx = subwdh / key->NBlockX;
blkszy = subhgt / key->NBlockY;
nimgavg = 3; /* First two for tracking, the third for change detection. */

/* Allocate memory. */
imgin = (short **) calloc(key->FrmRowSize, sizeof(short *));
imgsub = (short **) calloc(subhgt, sizeof(short *));
imgdif = (short **) calloc(subhgt, sizeof(short *));
imgsmth = (short **) calloc(subhgt, sizeof(short *));
imgcum = (int **) calloc(subhgt, sizeof(int *));
imgavg = (float ***) calloc(nimgavg, sizeof(float **));
imgpyr = (float **) calloc(subhgt, sizeof(float *));
imgcan = (short ***) calloc(4*key->NCanHist, sizeof(short **));
objmap = (char *) calloc(key->FrmRowSize*key->FrmColSize, sizeof(char));
argarr = (char **) calloc(64, sizeof(char *));
block = (struct Partition **) calloc(key->NBlockY, sizeof(struct Partition *));
change = (struct Point *) calloc(key->DetNumMax, sizeof(struct Point));
detect = (struct Point *) calloc(key->DetNumMax, sizeof(struct Point));
for (by=0; by<key->FrmRowSize; by++)
  imgin[by] = (short *) calloc(key->FrmColSize, sizeof(short));
for (by=0; by<subhgt; by++) {
  imgsub[by] = (short *) calloc(subwdh, sizeof(short));
  imgdif[by] = (short *) calloc(subwdh, sizeof(short));
  imgsmth[by] = (short *) calloc(subwdh, sizeof(short));
  imgcum[by] = (int *) calloc(subwdh, sizeof(int));
  imgpyr[by] = (float *) calloc(subwdh, sizeof(float));
}
for (bw=0; bw<nimgavg; bw++) {
  imgavg[bw] = (float **) calloc(key->FrmRowSize, sizeof(float *));
  for (by=0; by<key->FrmRowSize; by++)
    imgavg[bw][by] = (float *) calloc(key->FrmColSize, sizeof(float));
}
for (bw=0; bw<4*key->NCanHist; bw++) {
  imgcan[bw] = (short **) calloc(key->FrmRowSize, sizeof(short *));
  for (by=0; by<key->FrmRowSize; by++)
    imgcan[bw][by] = (short *) calloc(key->FrmColSize, sizeof(short));
}
for (bw=0; bw<64; bw++)
  argarr[bw] = (char *) calloc(60, sizeof(char));
for (by=0; by<key->NBlockY; by++) {
  block[by] = (struct Partition *) calloc(key->NBlockX, sizeof(struct Partition));
```

```
      for (bx=0; bx<key->NBlockX; bx++)
        block[by][bx].active = block[by][bx].stable = 0;
    }
/* Initialize map holder. */
for (bw=0; bw<key->FrmRowSize*key->FrmColSize; bw++)
  objmap[bw] = 0;

/* Set stdout to binary for Windows environment. */
#ifdef WIN32
  if(key->VerbInt >= 3) {
    fflush(stdout);
    _setmode(fileno(stdin),_O_BINARY);
    _setmode(fileno(stdout),_O_BINARY);
  }
endif /* Open the list file that contains the filenames of image frames. */
if ((lsfp = fopen(key->FrmListName, "r")) == NULL) {
  printf("Error! Can't open %s.\n", key->FrmListName);
  exit(1);
}
/* Process the image sequence. */
while(!feof(lsfp)) {
  /* Process the next image frame. */
  if (fscanf(lsfp, "%s", imgfname) == -1) {
    fclose(lsfp);
    break;
  }
  else {
    /* Read a given image frame. */
    sprintf(stmp, "%s/%s", key->LocFrmFiles, imgfname);
    READ_IMAGE(stmp, imgin, key);
    /* Perform the major tracking operation. */
    TRACKING(imgfname, imgin, imgsub, imgsmth, imgdif, imgpyr, imgcum, imgcan,
        imgavg, argarr, objmap, subhgt, subwdh, block, blkszx, blkszy,
        change, detect, key);
  }
}

/* Free memory. */
for (by=0; by<key->FrmRowSize; by++)
  free(imgin[by]);
for (by=0; by<subhgt; by++) {
  free(imgsub[by]);
```

```
    free(imgdif[by]);
    free(imgsmth[by]);
    free(imgcum[by]);
    free(imgpyr[by]);
  }
  for (bw=0; bw<nimgavg; bw++) {
    for (by=0; by<key->FrmRowSize; by++)
      free(imgavg[bw][by]);
    free(imgavg[bw]);
  }
  for (bw=0; bw<4*key->NCanHist; bw++) {
    for (by=0; by<key->FrmRowSize; by++)
      free(imgcan[bw][by]);
    free(imgcan[bw]);
  }
  for(bw=0; bw<key->NBlockY; bw++)
    free(block[bw]);
  for(bw=0; bw<64; bw++)
    free(argarr[bw]);
  free(block);
  free(argarr);
  free(objmap);
  free(imgin);
  free(imgsub);
  free(imgdif);
  free(imgsmth);
  free(imgcum);
  free(imgpyr);
  free(imgavg);
  free(imgcan);
  free(detect);
  free(change);
  free(key);

/* Done. */
  exit(0);

}
```

The third program, referred to as "FPSS.H", is the basic included file for the overall software and is used to perform the moving target detection and tracking for the video surveillance application.

```
#include <stdio.h>
#include <stdlib.h>
#include <math.h>
#include <ctype.h>
#include <string.h>
#include <limits.h>
#include <time.h>
#include <fcntl.h>
include <stddef.h> ifdef WIN32          /* For Windows platform. */
include <io.h>
#endif

/* Some formulae. */
#define SQ(X)   ((X)*(X))
#define MIN(X,Y) (X<Y) ? X : Y
define MAX(X,Y) (X>Y) ? X : Y /* Defining the structure of parameters. */
struct Params {
  float BlkMeanMin;   /* Min mean value of a block on a difference image */
                     /* required in order for that block to be further  */
                     /* processed for potential detections.             */
  int   BlkStabMax;   /* Maximum count of stable occurences of a block  */
                     /* that should be recorded. Larger value makes a  */
                     /* new stationary object takes longer to blend into */
                     /* the background model.                          */
  int   BlkStabMin;   /* Minimum count of stable occurences of a block  */
                     /* before it can be used detect target and update */
                     /* the background model.                          */
  int   ChkBlankImg;  /* When ChkBlankImg=1, check for near-blank input */
                     /* images by making sure the stddev >= FrmDevMin  */
                     /* and (mean / stddev) <= FrmMTSMax.              */
  float CritRegBoost; /* Specify the amount of boost that should be given */
                     /* to the detections identified within the area    */
                     /* defined as critical region.                    */
  float ChgActThrd;   /* Acceptance Threshold for valid Changes.         */
  float ChgEdgeThrd;  /* Edge Threshold for Changed objects, which is   */
                     /* used in the process of estimating the size and */
                     /* new center location of the object.             */
  int   ChgNumMax;    /* Max. number of Changes allowed in a frame.      */
  int   ChgShow;      /* Show the Changes between two reference images, */
                     /* which occur over a long period of time.        */
  int   ChgUpdate;    /* Update the first reference background image,  */
                     /* when ChangeShow == 1.                          */
```

```
int   DetNumMax;      /* Max. number of Detections allowed in a frame.  */
float DetActThrd;     /* Acceptance Threshold for valid Detections.     */
float DetEdgeThrd;    /* Edge Threshold for Detected objects, which is  */
                      /* used in the process of estimating the size and */
                      /* new center location of the object.             */
int   FrmColSize;     /* The horizontal size (column) of input frames.  */
float FrmInpDevMin;   /* Min. stddev required for an input image to be  */
                      /* considered as non-blank and deserve further    */
                      /* processing.                                    */
float FrmMTSMax;      /* Max. acceptable value of the Mean-to-Stddev    */
                      /* ratio of an input frame.                       */
int   FrmRowSize;     /* The vertical size (row) of input frames.       */
int   JitterCheck;    /* When JitterCheck=1, check for camera-induced   */
                      /* jitter or shaking between consecutive frames   */
                      /* to avoid vibrational false alarms.             */
int   JitPadNumX;     /* Specify the number of jitter checking pads in  */
                      /* horizontal direction.                          */
int   JitPadNumY;     /* Specify the number of jitter checking pads in  */
                      /* vertical direction.                            */
int   JitPadRngX;     /* Specify the range of jitter checking pads moving */
                      /* in horizontal direction.                       */
int   JitPadRngY;     /* Specify the range of jitter checking pads moving */
                      /* in vertical direction.                         */
int   JitPadSzX;      /* Specify the horizontal size of the pads.       */
int   JitPadSzY;      /* Specify the vertical size of the pads.         */
int   MedianFilter;   /* When MedianFilter=1, perform a median filtering */
                      /* on the input image. The default kernel size of */
                      /* this filter is 3x3.                            */
int   NBlockX;        /* The number of non-overlapping blocks to be used */
                      /* to partition the difference image in X-direction */
                      /* so that local mean and stddev may be computed. */
int   NBlockY;        /* The number of non-overlapping blocks to be used */
                      /* to partition the difference image in Y-direction */
                      /* so that local mean and stddev may be computed. */
int   NCanHist;       /* The number of frames to be included in computing */
                      /* the history or average of canonical images.    */
int   PixFlooring;    /* When PixFlooring=1, shift the lowest intensity */
                      /* to zero to avoid problematic high pixel levels */
                      /* with a narrow dynamic range.                   */
int   SubSampling;    /* When SubSampling=1, down-sampling the input data */
                      /* before performing all the frame-wide operations. */
int   SubSamTimes;    /* Define the magnitude of down-sampling to be used */
                      /* when SubSampling=1.                            */
int   VerbInt;        /* Verbal output of Intermediate information.     */
char  FrmFormat[20];  /* Format of the input frames: ARF, BMP, or PGM.  */
char  FrmListName[80]; /* Filename of the list of input frames used.    */
```

```
char LocFrmFiles[80]; /* Location of Lockheed Martin input Frames.   */
char LocOutFiles[80]; /* Location of processed image Output files.   */
};

/* Defining the structure of a detected point. */
struct Point {
  int xloc, yloc, hgt, wdh;
  float confval;
  struct Point *next;
};

/* Defining the structure of a partition or block. */
struct Partition {
  int active, stable;
  float mean, stddev;
};
```

The fourth program, referred to as "CONTROL.C", includes the control parameters and functions of the overall software and is used to perform the moving target detection and tracking for the video surveillance application.

```
#include "fpss.h"

/* Function Prototypes. */ void SET_PARAMETERS(struct Params *key, int argc, char *argv[]);

void MOD_PARAMETERS(struct Params *key, int argc, char *argv[]);

void SHOW_PARAMETERS(struct Params *key);

void QT_UPDATE(struct Params *key, char *args, char **argv, char *objmap);
```

```
/*************************************************************/
/* First set the control parameters with default values and then call the     */
/* MOD_PARAMETERS() to update the parameters with values from the command     */
/* line. If no other qualifiers, just show the default values and exit.        */
/*************************************************************/ void SET_PARAMETERS(struct Params *key, int argc, char *argv[])
{

/* First assign the default values of parameters. */ key->BlkMeanMin = 30.0;

key->BlkStabMax = 100;

key->BlkStabMin = 2;

key->ChgActThrd = 5000.0;

key->ChgEdgeThrd = 1000.0;

key->ChgNumMax = 20;

key->ChgShow = 1;

key->ChgUpdate = 0;

key->ChkBlankImg = 0;

key->CritRegBoost = 5.0;

key->FrmColSize = 640;

key->FrmInpDevMin = 20.0;

key->FrmMTSMax = 10.0;
```

```
key->FrmRowSize = 480;

key->DetNumMax = 20;

key->DetActThrd = 5000.0;

key->DetEdgeThrd = 1000.0;

key->JitterCheck = 0;

key->JitPadNumX = 9;

key->JitPadNumY = 5;

key->JitPadRngX = 3;

key->JitPadRngY = 5;

key->JitPadSzX = 8;

key->JitPadSzY = 8;

key->MedianFilter = 0;

key->NBlockX = 32;

key->NBlockY = 24;

key->NCanHist = 10;

key->PixFlooring = 0;

key->SubSampling = 1;

key->SubSamTimes = 2;

key->VerbInt = 0;

strcpy(key->FrmFormat, "jpg");

strcpy(key->FrmListName, "../lists/rf_50.list");

strcpy(key->LocFrmFiles, "../Dataset2/rf20041216_150031fi");

strcpy(key->LocOutFiles, "../Output_frames");
```

```
/* Then modify them as instructed by the command line arguements. */

MOD_PARAMETERS(key, argc, argv);

/* Show the current settings. */ if (key->VerbInt < 3) SHOW_PARAMETERS(key);

/* If argc == 1, quit. */ if (argc == 1) exit(0);

}

/**********************************************************************/
/*    Process the command line and update the corresponding parameters.        */
/**********************************************************************/ void MOD_PARAMETERS(struct Params *key, int argc, char *argv[])

{ int arg, itmp;

/* Modify parameters as instructed by the command line arguements. */ for (arg=1; arg<argc; arg++) { if (argv[arg][0] == '-') {
```

```
switch(argv[arg][1]) { case 'b':

if (argv[arg][2] == 'm') { key->BlkMeanMin = atof(argv[++arg]);

break;

} else if (argv[arg][2] == 'n') { key->BlkStabMin = atoi(argv[++arg]);

break;

} else if (argv[arg][2] == 'x') { key->BlkStabMax = atoi(argv[++arg]);

break;

} else { printf("\nOption %s is not defined.\n", argv[arg]);

break;

} case 'c':

if (argv[arg][2] == 'b') { key->ChkBlankImg = atoi(argv[++arg]);

break;

}
```

```
else if (argv[arg][2] == 'e') { key->ChgEdgeThrd = atof(argv[++arg]);

break;

} else if (argv[arg][2] == 'm') { key->ChgNumMax = atoi(argv[++arg]);

break;

} else if (argv[arg][2] == 'r') { key->CritRegBoost = atof(argv[++arg]);

break;

} else if (argv[arg][2] == 's') { key->ChgShow = atoi(argv[++arg]);

break;

} else if (argv[arg][2] == 't') { key->ChgActThrd = atof(argv[++arg]);

break;

} else if (argv[arg][2] == 'u') { key->ChgUpdate = atoi(argv[++arg]);

break;
```

```
      }
    else {
      printf("\nOption %s is not defined.\n", argv[arg]);
      break;
    }
  case 'd':
    if (argv[arg][2] == 'e') {
      key->DetEdgeThrd = atof(argv[++arg]);
      break;
    }
    else if (argv[arg][2] == 'm') {
      key->DetNumMax = atoi(argv[++arg]);
      break;
    }
    else if (argv[arg][2] == 't') {
      key->DetActThrd = atof(argv[++arg]);
      break;
    }
    else {
      printf("\nOption %s is not defined.\n", argv[arg]);
      break;
    }
  case 'f':
```

```c
if (argv[arg][2] == 'c') { key->FrmColSize = atoi(argv[++arg]);

break;

} else if (argv[arg][2] == 'f') { strcpy(key->FrmFormat, argv[++arg]);

break;

} else if (argv[arg][2] == 'i') { key->FrmInpDevMin = atof(argv[++arg]);

break;

} else if (argv[arg][2] == 'l') { strcpy(key->FrmListName, argv[++arg]);

break;

} else if (argv[arg][2] == 'm') { key->FrmMTSMax = atof(argv[++arg]);

break;

} else if (argv[arg][2] == 'r') { key->FrmRowSize = atoi(argv[++arg]);

break;
```

```c
            }
            else {
                printf("\nOption %s is not defined.\n", argv[arg]);
                break;
            }
        case 'j':
            if (argv[arg][2] == 'c') {
                key->JitterCheck = atoi(argv[++arg]);
                break;
            }
            else if (argv[arg][2] == 'n') {
                if (argv[arg][3] == 'x') {
                    key->JitPadNumX = atoi(argv[++arg]);
                    break;
                }
                else if (argv[arg][3] == 'y') {
                    key->JitPadNumY = atoi(argv[++arg]);
                    break;
                }
                else {
                    printf("\nOption %s is not defined.\n", argv[arg]);
                    break;
                }
```

```
        }
        else if (argv[arg][2] == 'r') {
            if (argv[arg][3] == 'x') {
                key->JitPadRngX = atoi(argv[++arg]);
                break;
            }
            else if (argv[arg][3] == 'y') {
                key->JitPadRngY = atoi(argv[++arg]);
                break;
            }
            else {
                printf("\nOption %s is not defined.\n", argv[arg]);
                break;
            }
        }
        else if (argv[arg][2] == 's') {
            if (argv[arg][3] == 'x') {
                key->JitPadSzX = atoi(argv[++arg]);
                break;
            }
            else if (argv[arg][3] == 'y') {
                key->JitPadSzY = atoi(argv[++arg]);
                break;
```

```
      }
    else {
      printf("\nOption %s is not defined.\n", argv[arg]);
       break;
      }
    }
  else {
    printf("\nOption %s is not defined.\n", argv[arg]);
    break;
    }
  case 'l':
    if (argv[arg][2] == 'f') {
      strcpy(key->LocFrmFiles, argv[++arg]);
      break;
      }
    else if (argv[arg][2] == 'o') {
      strcpy(key->LocOutFiles, argv[++arg]);
      break;
      }
    else {
      printf("\nOption %s is not defined.\n", argv[arg]);
      break;
      }
```

```
case 'm':

if (argv[arg][2] == 'f') { key->MedianFilter = atoi(argv[++arg]);

break;

} else { printf("\nOption %s is not defined.\n", argv[arg]);

break;

} case 'n':

if (argv[arg][2] == 'c') { key->NCanHist = atoi(argv[++arg]);

break;

} else if (argv[arg][2] == 'x') { key->NBlockX = atoi(argv[++arg]);

break;

} else if (argv[arg][2] == 'y') { key->NBlockY = atoi(argv[++arg]);

break;

} else {
```

```
      printf("\nOption %s is not defined.\n", argv[arg]);

break;

} case 'p':

if (argv[arg][2] == 'f') { key->PixFlooring = atoi(argv[++arg]);

break;

} else { printf("\nOption %s is not defined.\n", argv[arg]);

break;

} case 's':

if (argv[arg][2] == 's') { key->SubSampling = atoi(argv[++arg]);

break;

} else if (argv[arg][2] == 't') { key->SubSamTimes = atoi(argv[++arg]);

break;

} else { printf("\nOption %s is not defined.\n", argv[arg]);
```

```
        break;

} case 'v':

if (argv[arg][2] == 'i') { key->VerbInt = atoi(argv[++arg]);

break;

} else { printf("\nOption %s is not defined.\n", argv[arg]);

break;

} default:   printf("\nOption %s is not defined.\n", argv[arg]);  break;

}

} else printf("\nWarning!! %s is not a qualifier.\n", argv[arg]);

}

/* Check the consistency of parameters. */

/* We assume only the most positive peaks are interested as changes. */ if (key->ChgActThrd <= 0.0) { printf("\n Change acceptance [%f] must > 0.0.\n\n", key->ChgActThrd);

exit(1);

}
```

```
/* Obviously, the peak value should be higher than the boundary value. */ if (key->ChgActThrd <= key->ChgEdgeThrd) { printf("\n Change acceptance [%f] must > Boundary threshold [%f].\n\n", key->ChgActThrd, key->ChgEdgeThrd);

exit(1);

}

/* In order to make sense of the heightened alert in the critical or */

/* highly interested zone, the activation map must be boosted higher */

/* than the regular area. */ if (key->CritRegBoost <= 1.0) { printf("\n Critical Region boost factor [%f] must > 1.0.\n\n", key->CritRegBoost);

exit(1);

}

/* We assume only the most positive peaks are interested as detections. */ if (key->DetActThrd <= 0.0) { printf("\n Detection acceptance [%f] must > 0.0.\n\n", key->DetActThrd);

exit(1);

}

/* Obviously, the peak value should be higher than the boundary value. */ if (key->DetActThrd <= key->DetEdgeThrd) { printf("\n Detection acceptance [%f] must > Boundary threshold [%f].\n\n", key->DetActThrd, key->DetEdgeThrd);
```

```
    exit(1);
}

/* Check the image format types allowed. */ for (arg=0; arg<strlen(key->FrmFormat); arg++)

key->FrmFormat[arg] = (char) tolower(key->FrmFormat[arg]);

if (!(!strcmp(key->FrmFormat, "jpg") || !strcmp(key->FrmFormat, "pgm"))) { printf("\nImage format %s is not supported.\n\n", key->FrmFormat);

exit(1);

}

/* Check the number of cannonical images used in background substraction. */ if (key->NCanHist < 1) { printf("\n NCanHist [%d] must >= 1, preferably >= 5.\n\n", key->NCanHist);

exit(1);

}

/* If no sub-sampling is selected, that means subsampling ratio is 1. */ if (key->SubSampling == 0) { key->SubSamTimes = 1;

}

/* Check the legitimacy of sub-sampling range. */ if ((key->SubSamTimes < 1) || (key->SubSamTimes > 5)) { printf("\n SubSamTimes [%d] must be between 1 and 5.\n\n", key->SubSamTimes);

exit(1);

}
```

```c
/* Check the number of blocks to used in partitioning the difference image. */ itmp = key->FrmColSize / (key->NBlockX * key->SubSamTimes);

if ((key->NBlockX < 1) || (itmp < 10)) { printf("\n Number of X-partitions [%d] must between 1 and %d.\n\n",
        key->NBlockX, key->FrmColSize / (10 * key->SubSamTimes));

exit(1);

} if (itmp * key->NBlockX * key->SubSamTimes != key->FrmColSize) { printf("\n Number of X-partitions [%d] must be a factor of %d.\n\n",
        key->NBlockX, key->FrmColSize / key->SubSamTimes);

exit(1);

} itmp = key->FrmRowSize / (key->NBlockY * key->SubSamTimes);

if ((key->NBlockY < 1) || (itmp < 10)) { printf("\n Number of Y-partitions [%d] must between 1 and %d.\n\n",
        key->NBlockY, key->FrmRowSize / (10 * key->SubSamTimes));

exit(1);

} if (itmp * key->NBlockY * key->SubSamTimes != key->FrmRowSize) { printf("\n Number of Y-partitions [%d] must be a factor of %d.\n\n",
        key->NBlockY, key->FrmRowSize / key->SubSamTimes);

exit(1);

}
```

```c
  if (key->BlkStabMin < 0) { printf("\n Min stable background block [%d] must >= 0\n\n", key->BlkStabMin);

exit(1);

} if (key->BlkStabMin >= key->BlkStabMax) { printf("\n Min stable background block [%d] ", key->BlkStabMin);

printf("must < Max stable background block [%d]\n\n", key->BlkStabMax);

exit(1);

}

/* Limit the verbal interval range to the defined one. */ if ((key->VerbInt < 0) || (key->VerbInt > 3)) { printf("\n VerbInt [%d] must > 0 and <= 3.\n\n", key->VerbInt);

exit(1);

}

}

/***********************************************************************/
/*   Output the current value of parameters to the standard output.    */
/***********************************************************************/ void SHOW_PARAMETERS(struct Params *key)
```

```
{ printf("\n Current Parameters:");

printf("\n    -bm  for Min block Mean required further processing [%f]",
        key->BlkMeanMin);

printf("\n    -bn  for Min stable occurence to be a background block [%d]",
        key->BlkStabMin);

printf("\n    -bx  for Max stable occurence of a block allowed [%d]",
        key->BlkStabMax);

printf("\n    -cb  for Check for Blank input image [%d]",
        key->ChkBlankImg);

printf("\n    -ce  for object Edge threshold of Changes [%f]",
        key->ChgEdgeThrd);

printf("\n    -cm  for Max number of Changes allowed [%d]",
        key->ChgNumMax);

printf("\n    -cr  for Critical Region boost factor [%f]",
        key->CritRegBoost);

printf("\n    -cs  for Show the slow Changes [%d]",
        key->ChgShow);

printf("\n    -ct  for acceptance Threshold of Changes [%f]",
        key->ChgActThrd);

printf("\n    -cu  for Update the Change background [%d]",
        key->ChgUpdate);
```

```
printf("\n   -de  for object Edge threshold of Detections [%f]", key->DetEdgeThrd);

printf("\n   -dm  for Maximum number of Detections allowed [%d]", key->DetNumMax);

printf("\n   -dt  for acceptance Threshold of Detections [%f]", key->DetActThrd);

printf("\n   -fc  for Column size of input Frames [%d]", key->FrmColSize);

printf("\n   -ff  for File Format of the I/O images (jpg/pgm) [%s]", key->FrmFormat);

printf("\n   -fi  for min stddev for Input Frame [%f]", key->FrmInpDevMin);

printf("\n   -fl  for filename of Frame List to be tested [%s]", key->FrmListName);

printf("\n   -fm  for max Mean-to-Stddev ratio of input Frame [%f]", key->FrmMTSMax);

printf("\n   -fr  for Row size of input Frames [%d]", key->FrmRowSize);

printf("\n   -jc  for Jitter Checking of input images [%d]", key->JitterCheck);

printf("\n   -jnx for X number of Jitter checking pads [%d]", key->JitPadNumX);

printf("\n   -jny for Y number of Jitter checking pads [%d]",
```

```
        key->JitPadNumY);

printf("\n   -jrx for X moving Range of Jitter checking pads [%d]", key->JitPadRngX);

printf("\n   -jry for Y moving Range of Jitter checking pads [%d]", key->JitPadRngY);

printf("\n   -jsx for X Size of Jitter checking pads [%d]", key->JitPadSzX);

printf("\n   -jsy for Y Size of Jitter checking pads [%d]", key->JitPadSzY);

printf("\n   -lf  for Location of input Frames [%s]", key->LocFrmFiles);

printf("\n   -lo  for Location of output frames [%s]", key->LocOutFiles);

printf("\n   -mf  for Median Filtering the input image [%d]", key->MedianFilter);

printf("\n   -nc  for Number of frames for average Canonical image [%d]", key->NCanHist);

printf("\n   -nx  for Number of X blocks in partitioning image [%d]", key->NBlockX);

printf("\n   -ny  for Number of Y blocks in partitioning image [%d]", key->NBlockY);

printf("\n   -pf  for Pixel Flooring the input image [%d]", key->PixFlooring);
```

```
printf("\n  -ss  for Sub-Sampling the input image [%d]", key->SubSampling);

printf("\n  -st  for Times (2-5) of Sub-Sampling needed [%d]", key->SubSamTimes);

printf("\n  -vi  for Verbal output Intermediate information [%d]", key->VerbInt);

printf("\n\n");

}
```

```
/*********************************************************************/
/*   Change parameters according to information sent from QT GUI.              */
/*********************************************************************/ void QT_UPDATE(struct Params *key, char *args, char **argv, char *objmap)

{ int x, y=0, argc=1;

/* Copy the regular qualifiers from args to argv. */ for (x=0; ; x++) {
```

```
if (args[x] == '\n') {   /* Quit reading on end of line. */ argv[argc][y] = '\0';  /* Null terminate the final command so that */ break;           /* we can use strcmp later. */

} if (args[x] != ' ') { argv[argc][y] = args[x];

y++;

} else { argc++;

y = 0;

}

}

MOD_PARAMETERS(key, argc, argv);

if (strcmp(argv[argc],"newmap") == 0) { fread(objmap, sizeof(char), key->FrmRowSize*key->FrmColSize, stdin);

} else if (strcmp(argv[argc],"close") == 0) { exit(0);

}
```

}

The fifth program, referred to as "IMAGEIO.C", performs the input and output function of the imagery used by the overall software and is used to perform the moving target detection and tracking for the video surveillance application.

```c
#include "fpss.h"
#include <jpeglib.h>    /* For jpeg functions. */

/* Function Prototypes. */
void READ_IMAGE(char *fname, short **img, struct Params *key);
void READ_JPG_IMAGE(char *fname, short **img, struct Params *key);
void READ_PGM_IMAGE(char *fname, short **img, struct Params *key);
void WRITE_IMAGE(char *fname, short **img, int wdh, int hgt, char *format);
void WRITE_JPG_IMAGE(char *fname, short **img, int wdh, int hgt);
void WRITE_PGM_IMAGE(char *fname, short **img, int wdh, int hgt);
void HISTOGRAM(short **imgin, short **imgout, int wdh, int hgt,
        int pixrange, int minfreq);
```

```
/*******************************************************************/
/*  Read an short int image in JPG/PGM format with a given filename.    */
/*******************************************************************/ void READ_IMAGE(char *fname, short **img, struct Params *key)
{ if (!strcmp(key->FrmFormat, "jpg"))
    READ_JPG_IMAGE(fname, img, key);
  else if (!strcmp(key->FrmFormat, "pgm"))
    READ_PGM_IMAGE(fname, img, key);
  else {
    printf("Not a supported input format %s\n", key->FrmFormat);
    exit(1);
  }

}

/*******************************************************************/
/*            Read an image in JPG format.                          */
/*******************************************************************/
```

```
void READ_JPG_IMAGE(char *fname, short **img, struct Params *key)
{
    int pc, px, row_stride;     /* physical row width in output buffer */ short avgpix;

struct jpeg_decompress_struct cinfo;

struct jpeg_error_mgr jerr;

JSAMPARRAY buffer;          /* Output row buffer */

FILE * imgfp;               /* source file */

/* Open the input file. */
    if ((imgfp = fopen(fname, "rb")) == NULL) {
        fprintf(stderr, "Can't open %s\n", fname);
        exit(1);
    }

/* Allocate and initialize JPEG decompression object */
    cinfo.err = jpeg_std_error(&jerr);

jpeg_create_decompress(&cinfo);

/* Specify data source (eg, a file) */
    jpeg_stdio_src(&cinfo, imgfp);

/* Read file parameters with jpeg_read_header(). */
    /* We can ignore the return value from jpeg_read_header since */
```

```
/* (a) suspension is not possible with the stdio data source, and */

/* (b) we passed TRUE to reject a tables-only JPEG file as an error. */

/* Set parameters for decompression. We don't need to change any of */

/* the defaults set by jpeg_read_header(), so we do nothing here. */

(void) jpeg_read_header(&cinfo, TRUE);

/* Start decompressor. We can ignore the return value since suspension */

/* is not possible with the stdio data source. */

(void) jpeg_start_decompress(&cinfo);

/* After jpeg_start_decompress() we have the correct scaled output image */

/* dimensions available, as well as the output colormap if we asked for */

/* color quantization. We need to make an output work buffer of the */

/* right size, which is row_stride JSAMPLEs per row in output buffer. */ row_stride = cinfo.output_width * cinfo.output_components;

/* Make a one-row-high sample array that will be freed at the end. */ buffer = (*cinfo.mem->alloc_sarray)

((j_common_ptr) &cinfo, JPOOL_IMAGE, row_stride, 1);

/* Check the size of the image first. */ if ((key->FrmColSize != cinfo.output_width) ||

(key->FrmRowSize != cinfo.output_height)) { printf("\n\nImage size of %s is %d x %d\n", fname, cinfo.output_width,
```

```
        cinfo.output_height);
printf("Expected size is %d x %d!\n\n", key->FrmColSize, key->FrmRowSize);
exit(1);
}

/* While (scan lines remain to be read) jpeg_read_scanlines(...); */
/* we use the library's state variable cinfo.output_scanline as the */
/* loop counter, so that we don't have to keep track ourselves. */
while (cinfo.output_scanline < cinfo.output_height) {
  /* jpeg_read_scanlines expects an array of pointers to scanlines. */
  /* Here the array is only one element long, but you could ask for */
  /* more than one scanline at a time if that's more convenient. */
  (void) jpeg_read_scanlines(&cinfo, buffer, 1);
  /* Assume we want only grepscale images regardless of whether the */
  /* original images have color or not. If they are color images, then */
  /* the greyscale version of them is computed by averaging the RGB parts */
  /* equally. In grayscale images with 3 components, each pixel is consist */
  /* of three identical RGB components. Note that the cinfo.output_scanline */
  /* is incremented after jpeg_read_scanlines() above, so the row */
  /* reference of img below is decreased by 1 to avoid segmentation error. */
  for (px=0; px<cinfo.output_width; px++) {
    avgpix = 0;
    for (pc=0; pc<cinfo.output_components; pc++)
```

```
            avgpix += (short) buffer[0][px * cinfo.output_components + pc];

avgpix /= (short) cinfo.output_components;

img[cinfo.output_scanline-1][px] = avgpix;

}
    }

/* Finish decompression. We can ignore the return value since suspension */
    /* is not possible with the stdio data source. */
    (void) jpeg_finish_decompress(&cinfo);

/* Release JPEG decompression object. */
    /* This is an important step since it will release a good deal of memory. */
    jpeg_destroy_decompress(&cinfo);

/* After finish_decompress, we can close the input file. */
    fclose(imgfp);

}

/****************************************************************************/
/*              Read an image in PGM format.                             */
/****************************************************************************/
```

```c
void READ_PGM_IMAGE(char *fname, short **img, struct Params *key)
{ int bx, by, col, row, greyscale;

char magic1, magic2;

unsigned char uctmp;

FILE *fp;

/* Open and read in the PGM image. */ if ((fp = fopen(fname, "rb")) == NULL) { printf("Error! Can't open %s.\n", fname);

exit(1);

}

/* Read the header information. */ magic1 = fgetc(fp);

magic2 = fgetc(fp);

/* Check if this is a PGM file or not. */ if ((magic1 != 'P') || (magic2 != '5')) { printf("\n%s is not a PGM file.\n\n", fname);

exit(1);

} fscanf(fp, "%d %d %d", &col, &row, &greyscale);
```

```c
/* Check the size of the image first. */ if ((key->FrmColSize != col) || (key->FrmRowSize != row)) { printf("\n\nImage size of %s is %d x %d\n", fname, col, row);

printf("Expected size is %d x %d!\n\n", key->FrmColSize, key->FrmRowSize);

exit(1);

}

/* Read the raster image. */ for (by=0; by<row; by++) { for (bx=0; bx<col; bx++) { fread(&uctmp, 1, sizeof(unsigned char), fp);

img[by][bx] = (short) uctmp;

}

}

/* Close the PGM file. */ fclose(fp);

}
```

/****************************************************************/
/* Write an short int image to a 8-bit JPG/PGM file with a given filename.   */
/****************************************************************/

```
void WRITE_IMAGE(char *fname, short **img, int wdh, int hgt, char *format)

{ if (!strcmp(format, "jpg"))
    WRITE_JPG_IMAGE(fname, img, wdh, hgt);
  else if (!strcmp(format, "pgm"))
    WRITE_PGM_IMAGE(fname, img, wdh, hgt);
  else {
    printf("Not a supported output format %s\n", format);
    exit(1);
  }

}
```

/****************************************************************/
/* Write an short int image to a JPEG file with a given filename.            */
/****************************************************************/

```c
void WRITE_JPG_IMAGE(char *fname, short **img, int wdh, int hgt)

{ int px, py, pz, quality=75;

struct jpeg_compress_struct cinfo;

struct jpeg_error_mgr jerr;

JSAMPLE *image_buffer;   /* typedef unsigned char JSAMPLE in jmorecfg.h */

JSAMPROW row_pointer[1]; /* pointer to JSAMPLE row[s] */ int row_stride;          /* physical row width in image buffer */

FILE *imgfp;             /* target file */ char *cutin;

/* Perform a histogram equalization on the image. */

/* Assume 8-bit PGM image is used and 1 occurence per bin required. */

HISTOGRAM(img, img, wdh, hgt, 255, 1);

/* Make sure the output file's extension is .jpg, not img/bmp/pgm instead. */ if ((cutin = strstr(fname, ".bmp")) || (cutin = strstr(fname, ".img"))

|| (cutin = strstr(fname, ".pgm"))) { cutin[0] = '.';

cutin[1] = 'j';

cutin[2] = 'p';

cutin[3] = 'g';
```

```
cutin[4] = '\0';

}

/* Allocate memory for image_buffer and copy the img to it. */ image_buffer = (JSAMPLE *) calloc(wdh*hgt, sizeof(JSAMPLE));

for (pz=0, py=0; py<hgt; py++)

for (px=0; px<wdh; px++)

image_buffer[pz++] = (JSAMPLE) img[py][px];

/* Allocate and initialize JPEG compression object */ cinfo.err = jpeg_std_error(&jerr);

jpeg_create_compress(&cinfo);

/* Specify data destination. */ if ((imgfp = fopen(fname, "wb")) == NULL) { fprintf(stderr, "can't open %s\n", fname);

exit(1);

} jpeg_stdio_dest(&cinfo, imgfp);

/* Set parameters for compression. */

/* First we supply a description of the input image. */

/* Four fields of the cinfo struct must be filled in: */
```

```
cinfo.image_width = wdh;   /* image width and height, in pixels */ cinfo.image_height = hgt;

cinfo.input_components = 1;          /* # of color components per pixel */ cinfo.in_color_space = JCS_GRAYSCALE;   /* colorspace of input image */

/* Now use the library's routine to set default compression parameters. */

/* (You must set at least cinfo.in_color_space before calling this, */

/* since the defaults depend on the source color space.) */ jpeg_set_defaults(&cinfo);

/* Now you can set any non-default parameters you wish to. */

/* Illustrate here the use of quality (quantization table) scaling: */ jpeg_set_quality(&cinfo, quality, TRUE /* limit to baseline-JPEG values */);

/* Start compressor. */

/* TRUE ensures that we will write a complete interchange-JPEG file. */

/* Pass TRUE unless you are very sure of what you're doing. */ jpeg_start_compress(&cinfo, TRUE);

/* While (scan lines remain to be written) jpeg_write_scanlines(...); */ row_stride = wdh * 1;       /* JSAMPLEs per row in image_buffer */

/* jpeg_write_scanlines expects an array of pointers to scanlines.

* Here the array is only one element long, but you could pass

* more than one scanline at a time if that's more convenient.

*/
```

```
while (cinfo.next_scanline < cinfo.image_height) { row_pointer[0] = & image_buffer[cinfo.next_scanline * row_stride];

(void) jpeg_write_scanlines(&cinfo, row_pointer, 1);

}

/* Finish compression. */ jpeg_finish_compress(&cinfo);

/* After finish_compress, we can close the output file. */ fclose(imgfp);

/* Release JPEG compression object */

/* This is an important step since it will release a good deal of memory. */ jpeg_destroy_compress(&cinfo);

/* Free image_buffer too. */ free(image_buffer);

}

/*******************************************************************/
/*   Write an short int image to a 8-bit PGM file with a given filename.        */
/*******************************************************************/
```

```c
void WRITE_PGM_IMAGE(char *fname, short **img, int wdh, int hgt)

{ int px, py;

FILE *imgfp;

char *cutin;

unsigned char uctmp;

/* Perform a histogram equalization on the image. */

/* Assume 8-bit PGM image is used and 1 occurence per bin required. */

HISTOGRAM(img, img, wdh, hgt, 255, 1);

/* Make sure the output file's extension is .pgm. */ if ((cutin = strstr(fname, ".bmp")) || (cutin = strstr(fname, ".jpg"))

|| (cutin = strstr(fname, ".img"))) { cutin[0] = '.';

cutin[1] = 'p';

cutin[2] = 'g';

cutin[3] = 'm';

cutin[4] = '\0';

}
```

```c
/* Open the output file. */ if ((imgfp = fopen(fname, "wb")) == NULL) { printf("\nError! Can't open %s to write output!\n\n", fname);

exit(1);

}

/* Write the PGM header information. */ fprintf(imgfp, "P5\n%d %d\n255\n", wdh, hgt);

/* Write image to output file. */ for (py=0; py<hgt; py++) { for (px=0; px<wdh; px++) { uctmp = (unsigned char) img[py][px];

fwrite(&uctmp, sizeof(unsigned char), 1, imgfp);

}

}

/* Close the output file. */ fclose(imgfp);

}
```

```
/********************************************************************/
/*      Perform non-linear mapping based on histogram information.    */
/********************************************************************/ void HISTOGRAM(short imgin, short imgout, int wdh, int hgt, int pixrange,
        int minfreq)
{ int py, px, num_bins, num_gaps=0, max=-INT_MAX, min=INT_MAX;
  float scale_factor, sum;
  short *hist;

/* Find the range of data. */
  for (py=0; py<hgt; py++) {
    for (px=0; px<wdh; px++) {
      if (max < imgin[py][px]) max = imgin[py][px];
      if (min > imgin[py][px]) min = imgin[py][px];
    }
  }
  num_bins = max - min + 1;

/* Allocate memory and fill the histogram. */
  hist = (short *) calloc(num_bins, sizeof(short));
```

```
for (py=0; py<hgt; py++)
  for (px=0; px<wdh; px++)
    hist[imgin[py][px]-min]++;

/* Find the number of gaps in the spectrum. */
for (py=0; py<num_bins; py++)
  if (hist[py] < minfreq) ++num_gaps;

/* Get the scale for the assume pixel intensity range. */
scale_factor = pixrange / (float) (num_bins - num_gaps);
sum = 0.0;
for (py=0; py<num_bins; py++) {
  if (hist[py] >= minfreq) sum += scale_factor;
  hist[py] = (short) sum;
}

/* Fill the imgout with new values. */
for(py=0; py<hgt; py++)
  for(px=0; px<wdh; px++)
    imgout[py][px] = hist[imgin[py][px]-min];

/* Free memory. */
free(hist);
```

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of tracking moving targets in video images, said method comprising:
    retrieving a plurality of reference video frames each comprising arrays of digital pixels;
    computing a first averaged image for each of said plurality of reference video frames, wherein each pixel value of said first averaged image comprises an average pixel intensity value associated with all corresponding pixel values in said plurality of reference video frames;
    computing a second averaged image for a second set of said plurality of reference video frames, wherein each pixel value of said second averaged image comprises an average pixel intensity value associated with all corresponding pixel values in said plurality of reference video frames;
    viewing an input video frame comprising arrays of digital pixels, wherein said input video frame is sequenced consecutively after said plurality of reference video frames;
    subtracting said input video frame from the first and second averaged images separately to form two difference images; and
    combining said difference images to form a change map.

2. The method of claim 1, further comprising multiplying each pixel value associated with a first difference image with the value of a corresponding pixel of the second difference image.

3. The method of claim 1, further comprising combining an even number of difference images together, wherein said even number is at least two.

4. The method of claim 1, further comprising computing a mean and standard deviation associated with said average pixel intensity values for each predefined, non-overlapping, and fully partitioning blocks of said change map.

5. The method of claim 1, further comprising measuring a magnitude of change experienced in each partitioning block of said change map.

6. The method of claim 1, further comprising:
    enhancing a digital signature of moving objects in said change map using a pyramidal mean stacking process;
    determining a pixel location in the enhanced change map that exhibits a highest pixel intensity value;
    determining whether said highest pixel intensity value meets a minimum acceptance threshold for detection; and
    determining whether a maximum allowable number of detections per input frame has been reached.

7. The method of claim 6, further comprising predefining values for said minimum acceptance threshold for detection and maximum allowable number of detections per input frame.

8. A program storage device readable by computer, tangibly embodying a program of instructions executable by said computer to perform a method of tracking moving targets in video images, said method comprising:
    retrieving a plurality of reference video frames each comprising arrays of digital pixels;
    computing a first averaged image for each of said plurality of reference video frames, wherein each pixel value of said first averaged image comprises an average pixel intensity value associated with all corresponding pixel values in said plurality of reference video frames;
    computing a second averaged image for a second set of said plurality of reference video frames, wherein each pixel value of said second averaged image comprises an average pixel intensity value associated with all corresponding pixel values in said plurality of reference video frames;
    viewing an input video frame comprising arrays of digital pixels, wherein said input video frame is sequenced consecutively after said plurality of reference video frames;
    subtracting said input video frame from the first and second averaged images separately to form two difference images; and
    combining said difference images to form a change map.

9. The program storage device of claim 8, wherein said method further comprises multiplying each pixel value associated with a first difference image with a value of a corresponding pixel of a second difference image.

10. The program storage device of claim 8, wherein said method further comprises combining an even number of difference images together, wherein said even number is at least two.

11. The program storage device of claim 8, wherein said method further comprises computing a mean and standard deviation associated with said average pixel intensity values for each predefined, non-overlapping, and fully partitioning blocks of said change map.

12. The program storage device of claim 8, wherein said method further comprises measuring a magnitude of change experienced in each partitioning block of said change map.

13. The program storage device of claim 8, wherein said method further comprises:
    enhancing a digital signature of moving objects in said change map using a pyramidal mean stacking process;
    determining a pixel location in the enhanced change map that exhibits a highest pixel intensity value;
    determining whether said highest pixel intensity value meets a minimum acceptance threshold for detection; and
    determining whether a maximum allowable number of detections per input frame has been reached.

14. The program storage device of claim 13, wherein said method further comprises predefining values for said minimum acceptance threshold for detection and maximum allowable number of detections per input frame.

15. A system for tracking moving targets in video images, said system comprising:
    means for retrieving a plurality of reference video frames each comprising arrays of digital pixels;
    means for computing a first averaged image for each of said plurality of reference video frames, wherein each pixel value of said first averaged image comprises an average pixel intensity value associated with all corresponding pixel values in said plurality of reference video frames;

means for computing a second averaged image for a second set of said plurality of reference video frames, wherein each pixel value of said second averaged image comprises an average pixel intensity value associated with all corresponding pixel values in said plurality of reference video frames;

means for viewing an input video frame comprising arrays of digital pixels, wherein said input video frame is sequenced consecutively after said plurality of reference video frames;

means for subtracting said input video frame from the first and second averaged images separately to form at least two difference images; and means for combining said difference images to form a change map.

16. The system of claim 15, further comprising means for multiplying each pixel value associated with a first difference image with a value of a corresponding pixel of a second difference image.

17. The system of claim 15, further comprising means for combining an even number of difference images together, wherein said even number is at least two.

18. The system of claim 15, further comprising means for computing a mean and standard deviation associated with said average pixel intensity values for each predefined, non-overlapping, and fully partitioning blocks of said change map.

19. The system of claim 15, further comprising means for measuring a magnitude of change experienced in each partitioning block of said change map.

20. The system of claim 15, further comprising:

means for enhancing a digital signature of moving objects in said change map using a pyramidal mean stacking process;

means for determining a pixel location in the enhanced change map that exhibits a highest pixel intensity value;

means for determining whether said highest pixel intensity value meets a minimum acceptance threshold for detection; and means for determining whether a maximum allowable number of detections per input frame has been reached.

21. The system of claim 20, further comprising means for predefining values for said minimum acceptance threshold for detection and maximum allowable number of detections per input frame.

* * * * *